(12) United States Patent  
Nakajima

(10) Patent No.: US 9,055,241 B2  
(45) Date of Patent: Jun. 9, 2015

(54) SOLID-STATE IMAGE PICKUP DEVICE, IMAGE PICKUP DEVICE, AND SIGNAL READING METHOD INCLUDING AN AVERAGING CIRCUIT FOR AVERAGING ACCUMULATED SIGNALS

(71) Applicant: OLYMPUS CORPORATION, Tokyo (JP)

(72) Inventor: Shinichi Nakajima, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 273 days.

(21) Appl. No.: 13/689,276

(22) Filed: Nov. 29, 2012

(65) Prior Publication Data

US 2013/0141620 A1    Jun. 6, 2013

(30) Foreign Application Priority Data

Dec. 1, 2011  (JP) .................................. 2011-263578  
May 16, 2012  (JP) .................................. 2012-112537  
Aug. 10, 2012  (JP) .................................. 2012-178332

(51) Int. Cl.
*H04N 5/335* (2011.01)  
*H04N 5/347* (2011.01)  
*H04N 5/374* (2011.01)  
*H04N 5/3745* (2011.01)

(52) U.S. Cl.
CPC ............... *H04N 5/335* (2013.01); *H04N 5/347* (2013.01); *H04N 5/3742* (2013.01); *H04N 5/37457* (2013.01)

(58) Field of Classification Search
CPC .......................... H01L 27/14634; H04N 5/335  
USPC .......................................................... 348/302  
See application file for complete search history.

(56) References Cited

U.S. PATENT DOCUMENTS 8,571,346 B2 * 10/2013 Lin ................................ 382/275  
2006/0023109 A1 * 2/2006 Mabuchi et al. .............. 348/340  
2013/0092820 A1 * 4/2013 Takemoto ................... 250/208.1  
2014/0139713 A1 * 5/2014 Gomi et al. ................... 348/308

FOREIGN PATENT DOCUMENTS

JP      2006-049361 A      2/2006

* cited by examiner

*Primary Examiner* — Gary C Vieaux  
(74) *Attorney, Agent, or Firm* — Westerman, Hattori, Daniels & Adrian, LLP

(57) ABSTRACT

A solid-state image pickup device in which a first substrate and a second substrate including circuit elements forming pixels and disposed therein are electrically connected by a connection unit, may include an averaging circuit that averages signals accumulated in signal accumulation circuits respectively included in the two or more pixels that are pixels included in the same group and are averaging targets, and an output circuit that outputs the averaged signals from the pixels. The pixels may be classified into a plurality of groups and each group may include the plurality of pixels. The pixels may include photoelectric conversion elements disposed in the first substrate, and the signal accumulation circuits that are disposed in the second substrate and accumulate signals that are generated by the photoelectric conversion elements and are input via the connection unit.

23 Claims, 15 Drawing Sheets

*FIG. 7A*

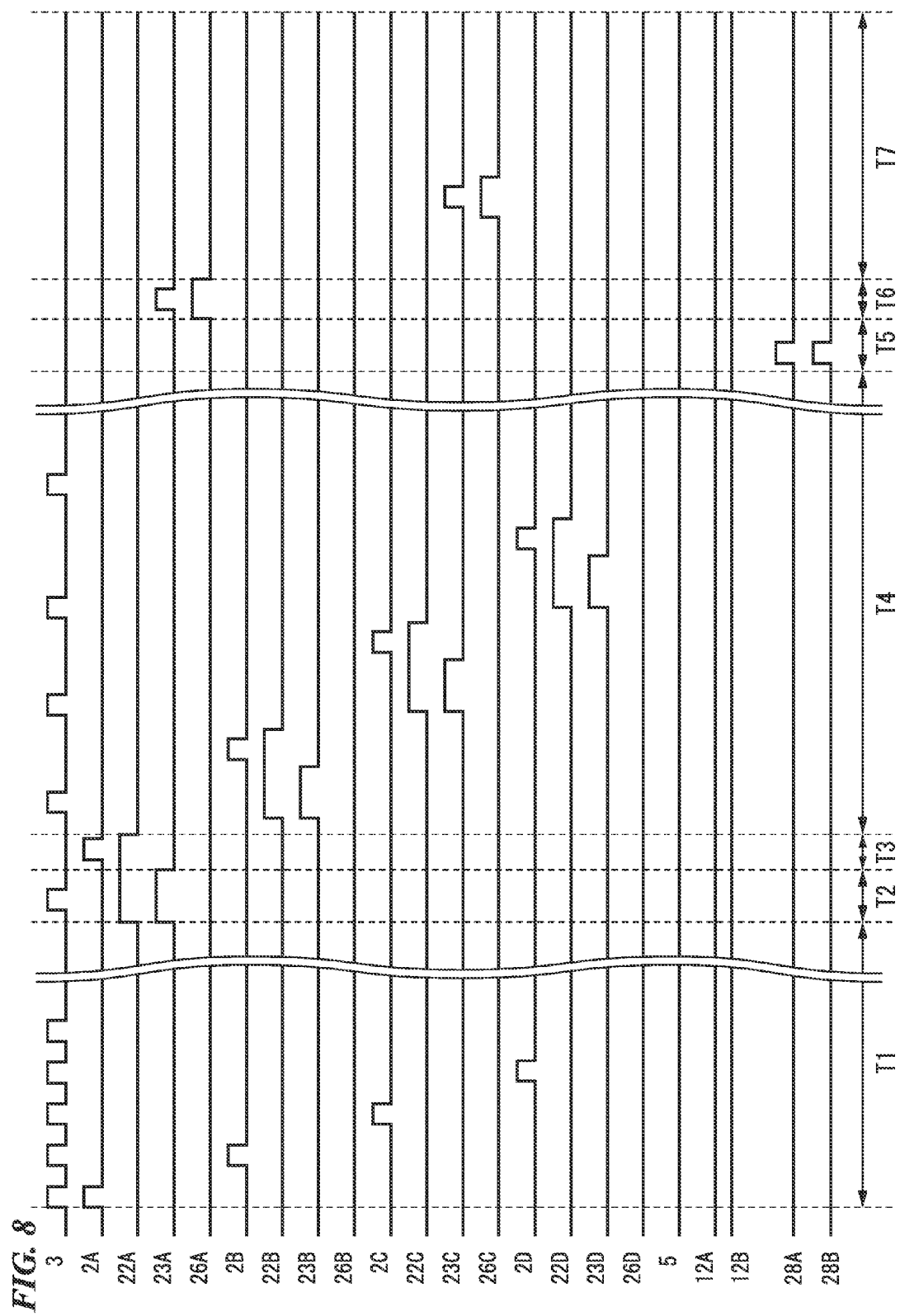

FIG. 9

| | RESET PERIOD | SIGNAL TRANSMISSION PERIOD | AVERAGING PROCESS PERIOD | READING PERIOD | | |
|---|---|---|---|---|---|---|
| V1 | | | | | | |
| V2 | RESET PERIOD | SIGNAL TRANSMISSION PERIOD | AVERAGING PROCESS PERIOD | | READING PERIOD | |
| V3 | RESET PERIOD | SIGNAL TRANSMISSION PERIOD | | | | |
| V4 | RESET PERIOD | SIGNAL TRANSMISSION PERIOD | | | | |
| ... | | | | | | |
| Vn-3 | RESET PERIOD | SIGNAL TRANSMISSION PERIOD | AVERAGING PROCESS PERIOD | | | |
| Vn-2 | RESET PERIOD | SIGNAL TRANSMISSION PERIOD | AVERAGING PROCESS PERIOD | | READING PERIOD | |
| Vn-1 | RESET PERIOD | SIGNAL TRANSMISSION PERIOD | | | | |
| Vn | RESET PERIOD | SIGNAL TRANSMISSION PERIOD | | | | READING PERIOD |

RELATED ART

RELATED ART

RELATED ART

RELATED ART

SOLID-STATE IMAGE PICKUP DEVICE, IMAGE PICKUP DEVICE, AND SIGNAL READING METHOD INCLUDING AN AVERAGING CIRCUIT FOR AVERAGING ACCUMULATED SIGNALS

BACKGROUND OF THE INVENTION

1. Field of the Invention

The present invention relates to a solid-state image pickup device and an image pickup device in which a plurality of substrates where circuit elements forming pixels are disposed are electrically connected to each other. In addition, the present invention relates to a signal reading method of reading a signal from a pixel.

Priority is claimed on Japanese Patent Applications No. 2011-263578, filed Dec. 1, 2011, No. 2012-112537, filed May 16, 2012, and No. 2012-178332, filed Aug. 10, 2012, the contents of which are incorporated herein by reference.

2. Description of the Related Art

All patents, patent applications, patent publications, scientific articles, and the like, which will hereinafter be cited or identified in the present application, will hereby be incorporated by reference in their entirety in order to describe more fully the state of the art to which the present invention pertains.

In recent years, with rapid spread of personal computers, demands for digital cameras which are image input apparatuses have been enlarged. There are several factors determining image quality of a digital camera, and, among the factors, the number of pixels of an image capturing element is the greatest factor determining the resolution of a captured image. For this reason, a digital camera with twelve million or more pixels has been recently commercialized.

There is known an amplification type solid-state image pickup device represented by a MOS type image sensor using a CMOS (Complementary Metal Oxide Semiconductor) as an image capturing element, or a charge transfer type solid-state image pickup device represented by a CCD (Charge Coupled Device) image sensor. These solid-state image pickup devices are widely used in digital still cameras, digital video cameras, and the like. Recently, as a solid-state image pickup device mounted in a mobile apparatus such as a mobile phone with a camera or a PDA (Personal Digital Assistant), a MOS type solid-state image pickup device having a low power supply voltage has frequently been used from the viewpoint of power consumption and the like.

In the related art, in the MOS type solid-state image pickup device, various solid-state image pickup devices have been proposed in which a semiconductor chip where a pixel region in which a plurality of pixels are arranged is formed and a semiconductor chip where a signal processing circuit is formed are electrically connected to each other so as to constitute a single device. For example, Japanese Unexamined Patent Application, First Publication No. 2006-49361 discloses a solid-state image pickup device in which a semiconductor chip where a micro pad is formed for each unit pixel cell or each cell collecting a plurality of pixels on a wire layer side and a signal processing chip where a micro pad is formed on a wire layer side of a position corresponding to the micro pad of the semiconductor chip are connected to each other using a micro bump.

FIG. 12 shows a configuration of a solid-state image pickup device in the related art. The solid-state image pickup device in the related art is formed by vertically overlapping a first substrate 201 having a MOS type image sensor with a second substrate 202 having a signal processing circuit. In the first substrate 201, light is incident from a surface on an opposite side to a surface connected to the second substrate 202. That is to say, in the first substrate 201, a wire layer is formed on the front surface side of the substrate, and light is incident from the rear surface side opposite to the front surface where the wire layer is formed.

In the wire layer of the first substrate 201, as described later, a plurality of micro pads 203 are formed for each cell including unit pixels, or for each cell collecting a plurality of pixels. In addition, a plurality of micro pads 204 corresponding to the micro pads 203 of the first substrate 201 are formed on the surface of a wire layer side of the second substrate 202. The first substrate 201 and the second substrate 202 are disposed in an overlapping manner such that the micro pads 203 and the micro pads 204 face each other. The micro pads 203 and the micro pads 204 are electrically connected to each other via micro bumps 205 and thereby are integrally formed. The micro pads 203 and 204 are formed using micro pads smaller than typical pads.

The second substrate 202 is formed so as to have an area larger than that of the first substrate 201. On the front surface of the second substrate 202, typical pads 206 are disposed at positions corresponding to the outside of the first substrate 201. The pads 206 constitute interfaces with systems other than a system including the two substrates.

FIG. 13 shows a configuration of the first substrate 201. The first substrate 201 includes a pixel unit 208 where a plurality of pixel cells 207 are arranged two-dimensionally, and a control circuit 209 which controls the pixel cells 207.

FIG. 14 shows a circuit configuration in the pixel cell 207 of the first substrate 201. Here, four pixels form a single pixel cell. The pixel cell 207 includes four photoelectric conversion elements 221A, 221B, 221C and 221D. The photoelectric conversion elements 221A, 221B, 221C and 221D are respectively connected to sources of corresponding four transfer transistors 222A, 222B, 222C and 222D. Gates of the transfer transistors 222A, 222B, 222C and 222D are respectively connected to transfer lines 227A, 227B, 227C and 227D via which transfer pulses are supplied. Drains of the transfer transistors 222A, 222B, 222C and 222D are commonly connected to a source of a reset transistor 223. A charge storage unit FD which is called a floating diffusion located between the drains of the transfer transistors 222A, 222B, 222C and 222D and the source of the reset transistor 223 is connected to a gate of an amplification transistor 224.

A drain of the reset transistor 223 is connected to a power supply line 232, and a gate of the reset transistor 223 is connected to a reset line 228 via which a reset pulse is supplied. A drain of an activation transistor 225 is connected to the power supply line 232, and a source of the activation transistor 225 is connected to a drain of the amplification transistor 224. A gate of the activation transistor 225 is connected to an activation line 229 via which an activation pulse is supplied. A source of the amplification transistor 224 is connected to a drain of an injection transistor 230. A source of the injection transistor 230 is connected to a ground potential, and a gate of the injection transistor 230 is connected to an injection line 231 via which an injection pulse is supplied. A connection midpoint between the amplification transistor 224 and the injection transistor 230 is connected to an output terminal 226.

The photoelectric conversion elements 221A, 221B, 221C and 221D, which are, for example, photodiodes, generate signal charges based on incident light, and store and accumulate the generated signal charges. The transfer transistors 222A, 222B, 222C and 222D are transistors which transfer the signal charges accumulated in the photoelectric conversion elements 221A, 221B, 221C and 221D to the charge storage unit FD. Turning-on and turning-off of the transfer transistors 222A, 222B, 222C and 222D are controlled by transfer pulses supplied from the control circuit 209 via the transfer lines 227A, 227B, 227C and 227D. The charge storage unit FD forms an input unit of the amplification transistor 224 and is a floating diffusion capacitor which temporarily stores and accumulates signal charges transferred from the photoelectric conversion elements 221A, 221B, 221C and 221D.

The reset transistor 223 is a transistor which resets the charge storage unit FD. Turning-on and turning-off of the reset transistor 223 are controlled by a reset pulse supplied from the control circuit 209 via the reset line 228. The reset transistor 223 and the transfer transistors 222A, 222B, 222C and 222D are turned on together, and thereby the photoelectric conversion elements 221A, 221B, 221C and 221D can be reset.

The amplification transistor 224 is a transistor which outputs, from the source thereof, an amplified signal obtained by amplifying a signal which is input to the gate thereof, based on the signal charge accumulated in the charge storage unit FD. The activation transistor 225 and the injection transistor 230 are transistors which supply a current for driving the amplification transistor 224 to the amplification transistor 224. Turning-on and turning-off of the activation transistor 225 are controlled by an activation pulse supplied from the control circuit 209 via the activation line 229, and turning-on and turning-off of the injection transistor 230 are controlled by an injection pulse supplied from the control circuit 209 via the injection line 231.

A single pixel cell 207 collecting four pixel is constituted by the photoelectric conversion elements 221A, 221B, 221C and 221D, the transfer transistors 222A, 222B, 222C and 222D, the reset transistor 223, the amplification transistor 224, the activation transistor 225, and the injection transistor 230. In addition, in the related art, on the first substrate 201, there is no vertical signal line for outputting a signal which is read to an external device of the substrate.

Next, with reference to 15, an operation of the pixel cell 207 will be described. First, an injection pulse Pn1 is applied to the injection transistor 230 via the injection line 231 so as to be turned on, and the potential of the output terminal 226 is fixed to 0 V. Next, a reset pulse Pr is applied to the reset transistor 223 via the reset line 228 so as to be turned on, and the potential of the charge storage unit FD is reset to a high level (power supply potential). When the potential of the charge storage unit FD becomes a high level, the amplification transistor 224 is turned on. Next, after the application of the injection pulse Pn1 is stopped and thus the injection transistor 230 is turned off, an activation pulse Pk1 is applied to the activation transistor 225 via the activation line 229 so as to be turned on. The activation transistor 225 is turned on, and thereby the potential of the output terminal 226 increases to a potential corresponding to the potential of the charge storage unit FD. The potential of the output terminal 226 at this time is referred to as a reset level.

Next, after the application of the activation pulse Pk1 is stopped and thus the activation transistor 225 is turned off, a transfer pulse Pt1 is applied to the transfer transistor 222A via the transfer line 227A so as to be turned on, and thereby a signal charge of the corresponding photoelectric conversion element 221A is transferred to the charge storage unit FD. Next, an injection pulse Pn2 is applied to the injection transistor 230 via the injection line 231 so as to be turned on, and the potential of the output terminal 226 becomes 0 V. Thereafter, an activation pulse Pk2 is applied to the activation transistor 225 via the activation line 229 so as to be turned on, and thereby the potential of the output terminal 226 increases to a potential corresponding to the potential of the charge storage unit FD. The potential of the output terminal 226 at this time is referred to as a signal level.

A signal based on the potential of the output terminal 226 is input to the second substrate 202 via the micro bumps 205. A difference between the signal level and the reset level is detected in the second substrate 202, and, an analog signal corresponding to the difference is digitalized, is demultiplexed, is stored in a memory, and is then sequentially output from the solid-state image pickup device. Here, an operation of reading a signal of the photoelectric conversion element 221A of the four photoelectric conversion elements 221A, 221B, 221C and 221D has been described. The same operation is sequentially performed on the other three photoelectric conversion elements 221B, 221C and 221D.

Through the operation, there is a slight difference in photosensing timing between the photoelectric conversion elements 221A, 221B, 221C and 221D; however, the photosensing timing is substantially aligned in a screen, thus synchronization of exposure in the upper side and the lower side of the pixel unit 208 can be realized, and thereby image processing speed can be also improved without causing considerable deterioration in image quality when a signal is read.

In the above-described related art, there is a slight difference in photosensing timing between the four photoelectric conversion elements 221A, 221B, 221C and 221D; however, the photosensing timing is substantially aligned in a screen, and thus synchronization of exposure in the upper side and the lower side of the pixel unit 208 can be realized. In order to realize the synchronization of exposure, the solid-state image pickup device in the related art includes an AD conversion circuit which converts an analog signal output from pixels into a digital signal, and memories holding digital signals of the same number as that of the photoelectric conversion elements.

In an operation in a mode for displaying a live view image on a view finder, or in a mode for recording moving images for HDTV, it is expected that 60 or more frames per second are required, or 120 frames per second are required depending on the case. In order to read signals at a high frame rate from all the pixels using recent digital cameras with increased pixels, many reading circuits are required to be operated in parallel. However, it is very difficult to realize reading at a high frame rate due to an increase in chip area or an increase in power consumption.

On the other hand, in live view image display or an HDTV moving image mode, the number of pixels such as twelve million pixels or sixteen million pixels is not necessary. For this reason, when signals are read from the pixels, a method of reading signals by thinning out pixels is considered. However, if the thinning-out is performed, moiré fringes occur and thus image quality deteriorates.

SUMMARY

The present invention provides a solid-state image pickup device capable of reducing deterioration in image quality.

A solid-state image pickup device in which a first substrate and a second substrate including circuit elements forming pixels and disposed therein are electrically connected by a connection unit, may include: an averaging circuit that averages signals accumulated in signal accumulation circuits respectively included in the two or more pixels that are pixels included in the same group and are averaging targets; and an output circuit that outputs the averaged signals from the pixels. The pixels may be classified into a plurality of groups and each group may include the plurality of pixels. The pixels may include: photoelectric conversion elements disposed in the first substrate; and the signal accumulation circuits that are disposed in the second substrate and accumulate signals that are generated by the photoelectric conversion elements and are input via the connection unit.

The solid-state image pickup device may further include: a control unit that controls the output circuit such that the averaged signals are output from some pixels of the pixels that are averaging targets, and the averaged signals are not output from the other pixels of the pixels that are averaging targets.

The pixels may be arranged in a matrix. The control unit may select the pixels that are output targets of the averaged signals from the plurality of pixels arranged in the same row for each group forming the plurality of groups.

The photoelectric conversion elements respectively included in all the pixels that are averaging targets may generate signals.

Each of the pixels may correspond to a predetermined color. The averaging circuit may average signals accumulated in the signal accumulation circuits respectively included in the two or more pixels that are pixels, corresponding to the same color, included in the same group and are averaging targets.

The averaging circuit may average accumulated signals at timing after the signals are accumulated in the signal accumulation circuits respectively included in the two or more pixels that are pixels included in the same group and are averaging targets.

After the signals are accumulated in the signal accumulation circuits, the averaging circuit may average the accumulated signals between different groups at the same timing.

The averaging circuit may be disposed in the second substrate.

The two or more pixels included in the same group may share the single connection unit.

The pixels may be arranged in a matrix. Each group may include the plurality of pixels arranged in the same column.

The output circuit may be able to be operated so as to switch between a first mode in which the averaged signals are output and a second mode in which signals generated by the photoelectric conversion elements are output without being averaged.

A solid-state image pickup device in which a first substrate and a second substrate including circuit elements forming pixels and disposed therein are electrically connected by a connection unit, may include: an averaging circuit that is connected to capacitors respectively included in the two or more pixels that are pixels included in the same group and are averaging targets, and averages signals accumulated in the capacitors; and an output circuit that is connected to the averaging circuit and outputs the averaged signals from the pixels. The pixels may be classified into a plurality of groups and each group may include the plurality of pixels. The pixels may include: photoelectric conversion elements disposed in the first substrate; a first connection circuit that is disposed in the first substrate and connects the photoelectric conversion elements to the connection unit; the capacitors that are disposed in the second substrate and accumulate signals generated by the photoelectric conversion elements; and a second connection circuit that is disposed in the second substrate and connects the connection unit to the capacitors.

A solid-state image pickup device may include: a first substrate that includes a unit pixel cell having a photoelectric conversion element and one or a plurality of first micro pads provided corresponding to one or a plurality of unit pixel cells; and a second substrate that includes a unit storage cell temporarily storing a signal generated by the photoelectric conversion element and one or a plurality of second micro pads provided corresponding to one or a plurality of unit storage cells. The first micro pad and the second micro pad may be connected to each other by a micro bump or through direct connection so as to operate the solid-state image pickup device. The second substrate may further include a cell connection circuit that connects the plurality of unit storage cells to each other, temporarily stores a signal generated by the photoelectric conversion element in the unit storage cell, and then performs an averaging process on the signal by connecting the plurality of unit storage cells using the cell connection circuit.

An image pickup device may include: a solid-state image pickup device in which a first substrate and a second substrate including circuit elements forming pixels and disposed therein are electrically connected by a connection unit. The solid-state image pickup device may include: an averaging circuit that averages signals accumulated in signal accumulation circuits respectively included in the two or more pixels that are pixels included in the same group and are averaging targets; and an output circuit that outputs the averaged signals from the pixels. The pixels may be classified into a plurality of groups and each group may include the plurality of pixels. The pixels may include: photoelectric conversion elements disposed in the first substrate; and the signal accumulation circuits that are disposed in the second substrate and accumulate signals which are generated by the photoelectric conversion elements and are input via the connection unit.

A signal reading method of reading signals from pixels of a solid-state image pickup device in which a first substrate and a second substrate including circuit elements forming the pixels and disposed therein are electrically connected by a connection unit, the pixels are classified into a plurality of groups each of which includes the plurality of pixels, and the pixels include photoelectric conversion elements disposed in the first substrate and signal accumulation circuits disposed in the second substrate and accumulating signals that are generated by the photoelectric conversion elements and are input via the connection unit, may include: causing the photoelectric conversion elements to generate signals; inputting the generated signals by the photoelectric conversion elements to the signal accumulation circuits via the connection unit; averaging signals accumulated in signal accumulation circuits respectively included in the two or more pixels that are pixels included in the same group and are averaging targets; and outputting the averaged signals from the pixels.

A solid-state image pickup device in which a first substrate and a second substrate including circuit elements forming pixels and disposed therein are electrically connected by a connection unit, may include: an averaging circuit that averages color signals accumulated in signal accumulation circuits respectively included in the two or more pixels that are pixels included in the same group and are averaging targets; and an output circuit that outputs the color signals from the pixels. The pixels may be classified into a plurality of groups and each group may include the plurality of pixels. The pixels may include: photoelectric conversion elements that are disposed in the first substrate and each of which generates a color signal of a color corresponding to any one of a plurality of colors; and the signal accumulation circuits that are disposed in the second substrate and accumulate color signals that are generated by the photoelectric conversion elements and are input via the connection unit. An arrangement of colors corresponding to the color signals generated by the photoelectric conversion elements disposed in the first substrate may be different from an arrangement of colors corresponding to the color signals accumulated in the signal accumulation circuits disposed in the second substrate.

The pixels may be arranged in a matrix. The averaging circuit may average the color signals corresponding to the same color of the color signals accumulated in the two or more signal accumulation circuits.

In the second substrate, the pixels that respectively include the two or more signal accumulation circuits accumulating the color signals, corresponding to the same color, averaged by the averaging circuit, may be adjacent to each other in a column direction.

The pixels may be arranged in a matrix. The output circuit may output averaged color signals from the pixels obtained by thinning out the pixels in the second substrate in a column direction.

The averaging circuit may average accumulated color signals at timing after the color signals are accumulated in the signal accumulation circuits respectively included in the two or more pixels that are pixels included in the same group and are averaging targets.

After the color signals are accumulated in the signal accumulation circuits, the averaging circuit may average the accumulated color signals between different groups at the same timing.

The two or more pixels included in the same group may share the single connection unit.

The pixels may be arranged in a matrix. Each group may include the plurality of pixels arranged in the same column.

According to the preferred embodiment of the present invention, by averaging color signals accumulated in the signal accumulation circuits respectively included in two or more pixels which are averaging targets, it is possible to suppress the occurrence of moiré fringes in an image formed by signals output from the pixels and to reduce a random noise component included in the signals. Therefore, it is possible to reduce the deterioration in image quality.

BRIEF DESCRIPTION OF THE DRAWINGS

The above features and advantages of the present invention will be more apparent from the following description of certain preferred embodiments taken in conjunction with the accompanying drawings, in which:

FIGS. 7A and 7B are reference diagrams illustrating a correspondence relationship between the unit pixel cell and the unit storage cell included in the image capturing unit of the image pickup device in accordance with the first preferred embodiment of the present invention and the respective colors;

FIG. 8 is a timing chart illustrating operations of the unit pixel cell and the unit storage cell included in the image capturing unit of the image pickup device in accordance with the first preferred embodiment of the present invention;

FIG. 9 is a timing chart illustrating operations of the unit pixel cell and the unit storage cell included in the image capturing unit of the image pickup device in accordance with the first preferred embodiment of the present invention;

DETAILED DESCRIPTION OF THE PREFERRED EMBODIMENTS

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated for explanatory purpose.

Figure 1:
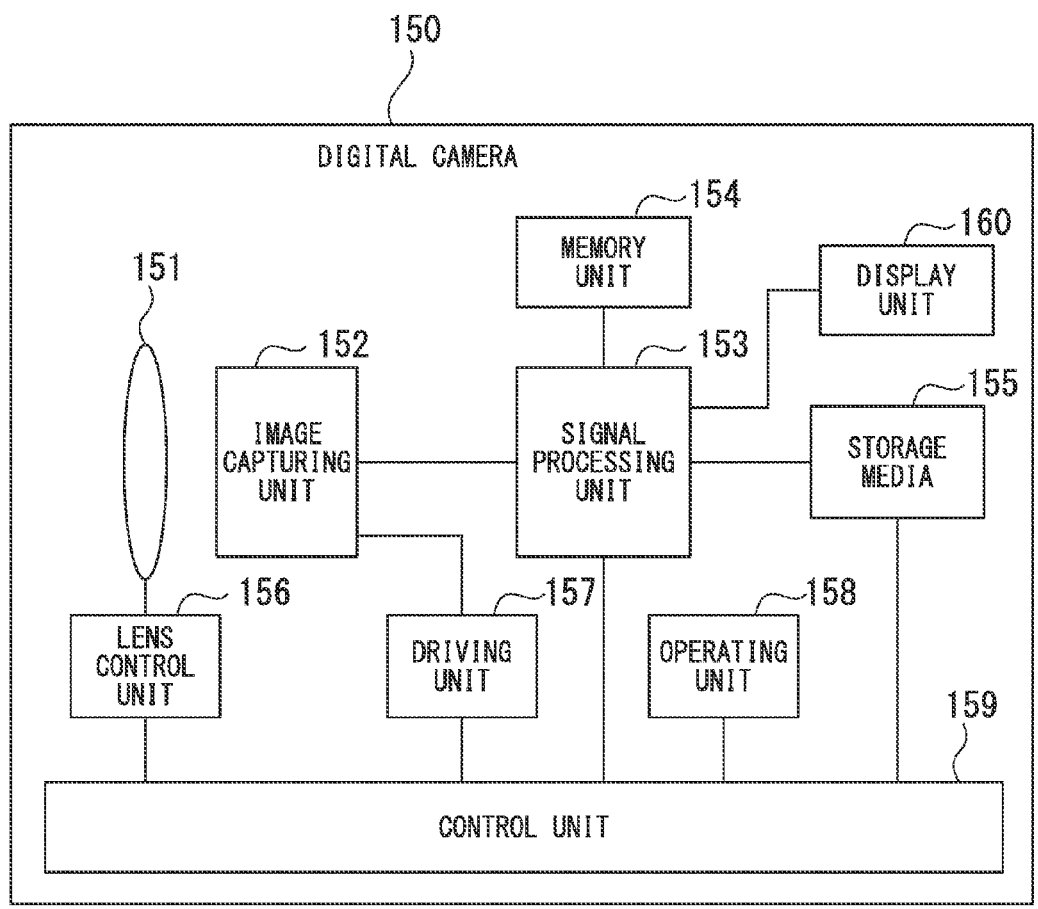
FIG. 1 is a block diagram illustrating a configuration of an image pickup device in accordance with a first preferred embodiment of the present invention.

FIG. 1 shows a configuration of an image pickup device (a digital camera 150) including a solid-state image pickup device in accordance with a first preferred embodiment of the present invention. The image pickup device related to an aspect of the present invention may be a digital video camera, an endoscope, or the like in addition to a digital camera as long as it is an electronic apparatus having an image capturing function.

The digital camera 150 shown in FIG. 1 includes a lens unit 151, an image capturing unit 152, a signal processing unit 153, a memory unit 154, a storage media 155, a lens control unit 156, a driving unit 157, an operating unit 158, a control unit 159, and a display unit 160. The respective blocks shown in FIG. 1 are implemented using various components including electric circuit components such as a CPU of a computer and a memory, optical components such as a lens, operation components such as a switch, and the like, in terms of hardware, and are implemented using a computer program and the like in terms of software. Here, the blocks are shown as a functional block implemented in cooperation with each other. Therefore, it can be understood by a person skilled in the art that this functional block can be implemented in various forms through combinations of hardware and software.

The lens unit 151 has a zoom lens or a focus lens and forms an image corresponding to light from a subject on a light receiving surface of the image capturing unit 152 as a subject image. The lens control unit 156 controls zooming, focusing, a diaphragm, and the like of the lens unit 151. The light received via the lens unit 151 is formed as an image on the light receiving surface of the image capturing unit 152. The image capturing unit 152 constitutes a solid-state image pickup device, and converts the subject image formed on the light receiving surface into an image signal so as to be output. A plurality of pixels are arranged on the light receiving surface of the image capturing unit 152 two-dimensionally in a row direction and a column direction.

The signal processing unit 153 performs preset processes for the image signal output from the image capturing unit 152. The processes performed by the signal processing unit 153 may include a variety of corrections of image data, compression of image data, and the like. The memory unit 154 temporarily stores image data.

The display unit 160 performs display of moving images (live view images), display of still images, display of moving images or still images recorded on the storage media 155, display of a state of the digital camera 150, and the like. The storage media 155 is constituted by a semiconductor memory or the like for recording or reading image data, and is embedded in the digital camera 150 in a detachable state.

The driving unit 157 drives the image capturing unit 152 and controls an operation thereof. The operating unit 158 includes a release button and the like for an operator inputting an image capturing start instruction, detects an operation input performed by the operator, and outputs a signal corresponding to operation contents. The control unit 159 controls the overall digital camera 150. In addition, the control unit 159 outputs control signals to the respective units constituting the digital camera 150, in response to signals output from the operating unit 158.

Figure 2:
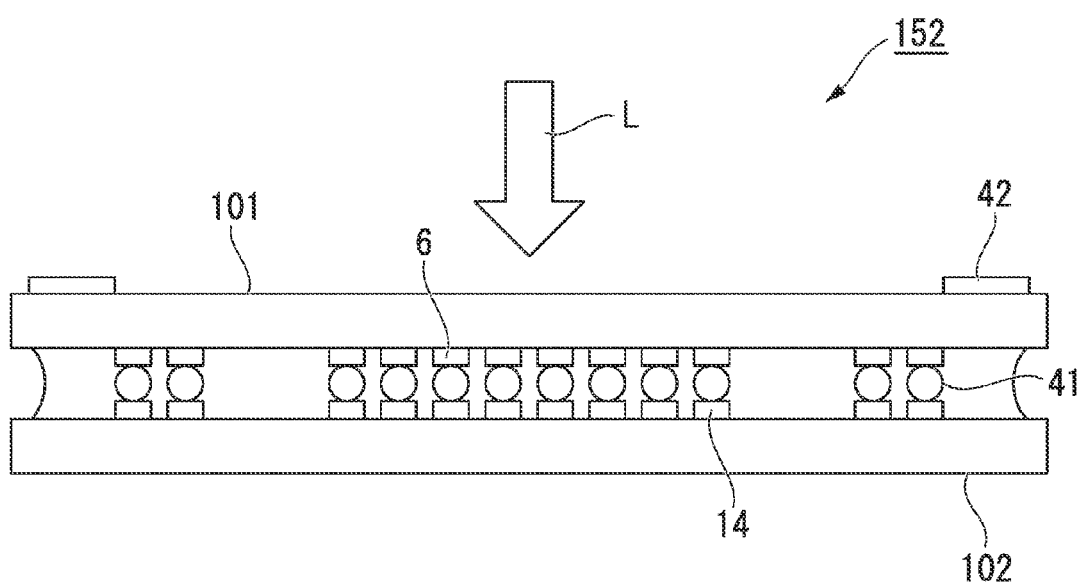
FIG. 2 is a cross-sectional view of an image capturing unit included in the image pickup device in accordance with the first preferred embodiment of the present invention.

FIG. 2 shows a configuration of the image capturing unit 152. The image capturing unit 152 has a structure where two substrates (a first substrate 101 and a second substrate 102) in which circuit elements (photoelectric conversion elements, transistors, capacitors, and the like) forming pixels are disposed overlap each other. The circuit elements forming the pixels are distributed over and disposed in the first substrate 101 and the second substrate 102. The first substrate 101 and the second substrate 102 are electrically connected to each other such that electric signals can be sent and received between the two substrates when the pixels are driven.

Of the two main surfaces of the first substrate 101 (the surfaces having the larger surface area than the side surfaces), photoelectric conversion elements are formed in the main surface on a side irradiated with light L, and light applied to the first substrate 101 is incident to the photoelectric conversion elements. Of the two main surfaces of the first substrate 101, in the main surface on an opposite side to the main surface on the side irradiated with the light L, a plurality of micro pads which are electrodes for connection to the second substrate 102 are formed as output terminals 6 of the first substrate 101 side. In addition, of two main surfaces of the second substrate 102, in the main surface on a side facing the first substrate 101, a plurality of micro pads which are electrodes for connection to the first substrate 101 are formed as input terminals 14 of the second substrate 102 side at positions corresponding to the output terminals 6.

Micro bumps 41 are formed between the output terminals 6 and the input terminals 14. In the first substrate 101 and the second substrate 102, the output terminals 6 and the input terminals 14 which are micro pads are disposed in an overlapping manner so as to face each other, and the output terminals 6 and the input terminals 14 are integrally formed so as to be electrically connected to each other via the micro bumps 41. The output terminals 6, the micro bumps 41, and the input terminals 14 constitute a connection unit which connects the first substrate 101 to the second substrate 102. A signal based on a signal charge generated by the photoelectric conversion element disposed in the first substrate 101 is output to the second substrate 102 via the output terminals 6, the micro bumps 41, and the input terminals 14. Pads 42 used as interfaces with systems other than the first substrate 101 and the second substrate 102 are formed in a peripheral unit of the main surface, to which the light L is incident, of the two main surfaces of the first substrate 101.

Although, in FIG. 2, the micro bumps are provided between the micro pads and thereby the first substrate 101 is connected to the second substrate 102, the present invention is not limited thereto. For example, without providing the micro bumps, micro pads (first electrodes) provided on the surface of the first substrate 101 may be directly bonded to micro pads (second electrodes) provided on the surface of the second substrate 102, thereby connecting the first substrate 101 to the second substrate 102.

There are cases where a signal is sent and received between the first substrate 101 and the second substrate 102 even for constituent elements other than a pixel, and, in the same manner as a pixel, the first substrate 101 and the second substrate 102 may be connected to each other using micro pads and micro bumps, or the first substrate 101 and the second substrate 102 may be connected to each other by directly connecting micro pads to each other.

The image capturing unit 152 of the first preferred embodiment performs signal reading using a plurality of reading methods. The reading method is a series of sequences from exposure to signal reading in the pixel. Specifically, the image capturing unit 152 uses two reading methods (a global shutter method and a rolling shutter method). In the global shutter method, a signal is read via both the first substrate 101 and the second substrate 102 (a global shutter operation). In addition, in the rolling shutter method, a signal is read via only the first substrate 101 (a rolling shutter operation). For example, when an operation is performed in a still image capturing mode (a first mode), a signal is read through the global shutter operation, and when an operation is performed in a moving image capturing mode (a second mode), a signal is read through the rolling shutter operation.

Figure 3:
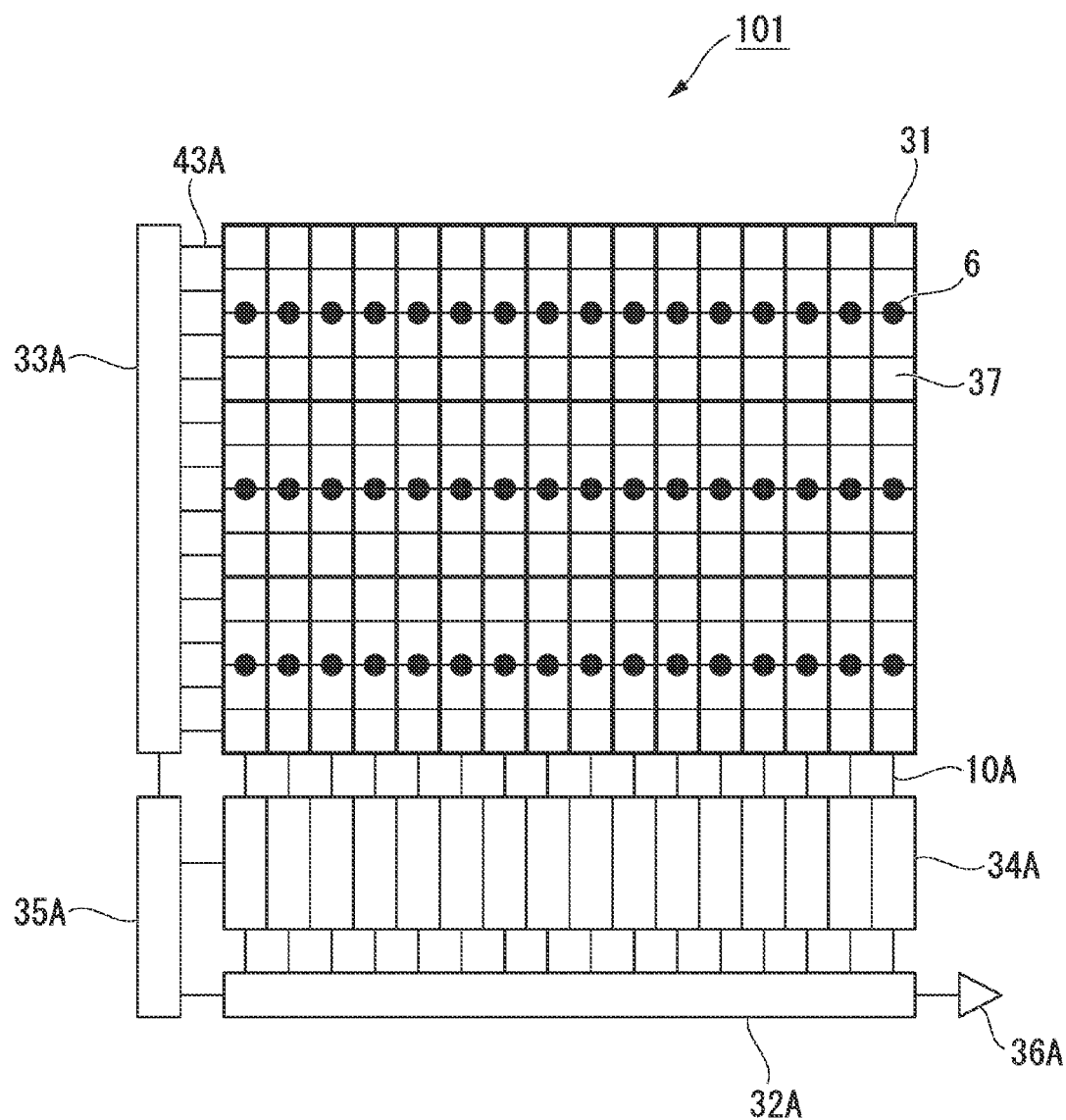
FIG. 3 is a block diagram illustrating a configuration of a first substrate included in the image pickup device in accordance with the first preferred embodiment of the present invention.

FIG. 3 shows a configuration of the first substrate 101. The first substrate 101 includes unit pixel cells 31, a horizontal driving circuit 32A, a vertical driving circuit 33A, a column circuit unit 34A, a control circuit 35A, and an output circuit 36A.

The unit pixel cell 31 has a plurality of unit pixels 37. In the example of the first preferred embodiment, the unit pixel cell 31 includes four unit pixels 37 which are arranged in the vertical direction. The unit pixels 37 are disposed in a two-dimensional matrix and belong to any one of unit pixel cells 31 (groups). The arrangement of the unit pixels shown in FIG. 2 is an example, and the number of rows and the number of columns may be two or more. Although, in the first preferred embodiment, a region including all the unit pixels 37 of the image capturing unit 152 is a reading target region of a signal, a part of the region including all the unit pixels 37 of the image capturing unit 152 may be a reading target region. The reading target region preferably includes all the pixels of at least an effective pixel region. In addition, the reading target region may include optical black pixels (pixels to which light is blocked from being incident at all times) disposed outside the effective pixel region. A signal from the optical black pixels is used to, for example, correct a dark current component.

The control circuit 35A receives an input clock or data for instructing an operation mode or the like from an external device of the first substrate 101, and supplies clocks or pulses required for operations of the following units in response to the received input clock or data. The vertical driving circuit 33A selects a row in the arrangement of the unit pixels 37, and supplies a control signal for an operation of the unit pixels 37 to the unit pixels 37 of the row via a control signal line 43A provided for each row. The vertical driving circuit 33A controls an operation of the unit pixels 37 by supplying a control signal to the unit pixels 37. Under the control of the vertical driving circuit 33A, the unit pixels 37 output a signal to a vertical signal line 10A provided for each column. The vertical signal line 10A outputs a signal read from the unit pixels 37 to the column circuit unit 34A provided for each column.

The column circuit unit 34A performs processes such as CDS (Correlated Double Sampling: fixed pattern noise removing process), signal amplification, and AD conversion on the signal read to the vertical signal line 10A. The horizontal driving circuit 32A sequentially selects the column circuit units 34A and outputs signals processed by the column circuit units 34A from the output circuit 36A. The output terminals 6 will be described later.

Figure 4:
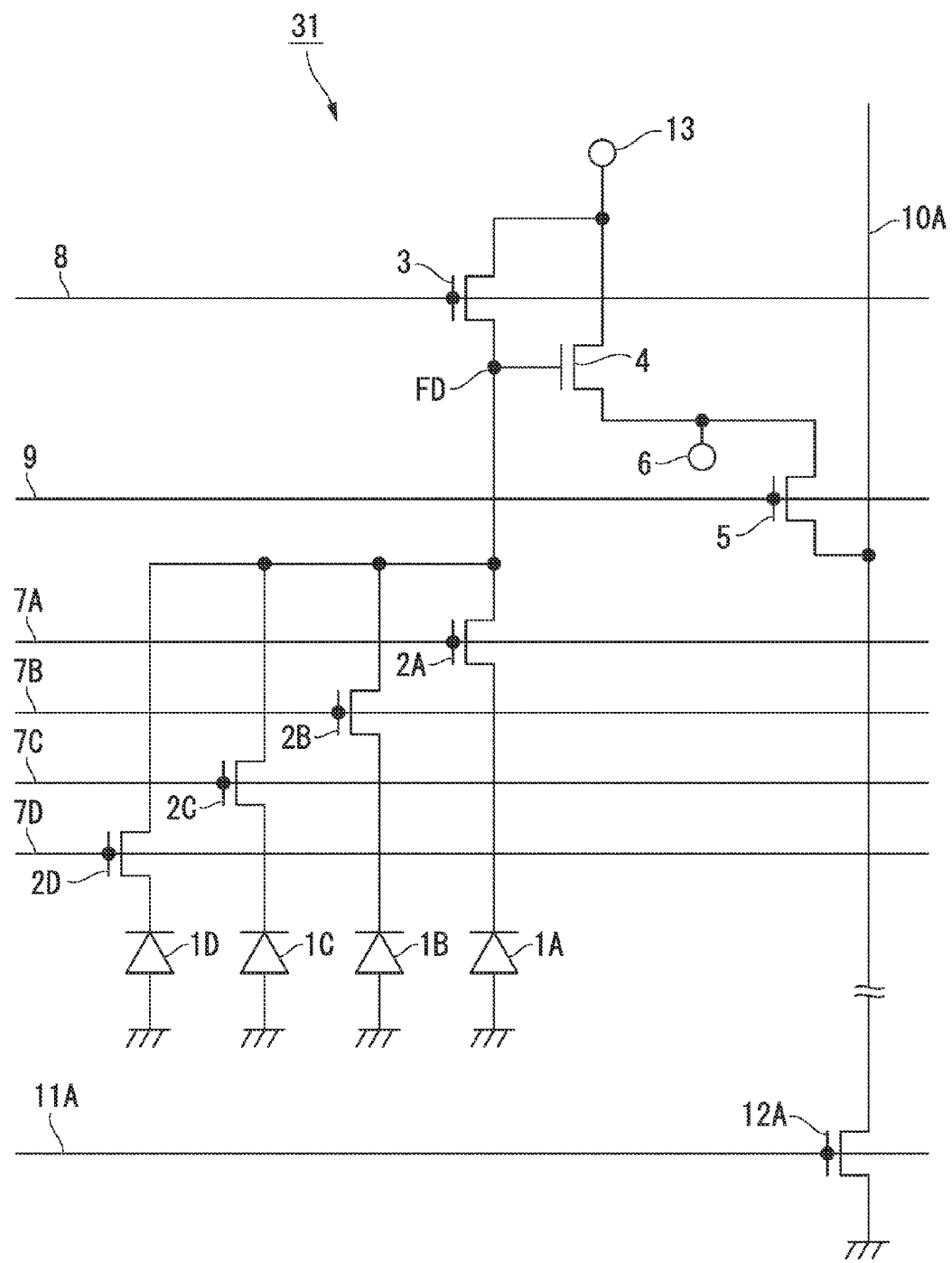
FIG. 4 is a circuit diagram illustrating a circuit configuration of a unit pixel cell included in the image capturing unit of the image pickup device in accordance with the first preferred embodiment of the present invention.

FIG. 4 shows a circuit configuration in the unit pixel cell 31 of the first substrate 101. In the following description, in relation to each transistor, polarities of the transistor can be changed randomly, and thus a source and a drain of each transistor are not fixed. For this reason, one of the source and the drain of each transistor is referred to as one end or a first end, and the other thereof is referred to as the other end or a second end.

Photoelectric conversion elements 1A, 1B, 1C and 1D are respectively connected to first ends of corresponding four transfer transistors 2A, 2B, 2C and 2D. Gates of the transfer transistors 2A, 2B, 2C and 2D are respectively connected to transfer lines 7A, 7B, 7C and 7D via which transfer pulses are supplied. Second ends of the transfer transistors 2A, 2B, 2C and 2D are commonly connected to one end of a reset transistor 3. In addition, a charge storage unit FD located between the second ends of the transfer transistors 2A, 2B, 2C and 2D and the reset transistor 3 is connected to a gate of an amplification transistor 4.

The other end of the reset transistor 3 is a power supply line 13, and a gate of the reset transistor 3 is connected to a reset line 8 via which a reset pulse is supplied. One end of the amplification transistor 4 is connected to the power supply line 13. One end of a selection transistor 5 is connected to the other end of the amplification transistor 4, and the other end of the selection transistor 5 is connected to the vertical signal line 10A. A gate of the selection transistor 5 is connected to a selection line 9 via which a selection pulse is supplied. A connection midpoint between the amplification transistor 4 and the selection transistor 5 is connected to the output terminal 6.

One end of the vertical signal line 10A is connected to one end of a load transistor 12A. The other end of the vertical signal line 10A is connected to the column circuit unit 34A. The load transistor 12A is provided for each column so as to correspond to the vertical signal line 10A. The other end of the load transistor 12A is connected to a ground potential. A gate of the load transistor 12A is connected to a load line 11A.

The transfer lines 7A, 713, 7C and 7D, the reset line 8, the selection line 9, and the load line 11A constitute the control signal line 43A.

The photoelectric conversion elements 1A, 1B, 1C and 1D, which are, for example, photodiodes, generate signal charges based on incident light, and store and accumulate the generated signal charges. The transfer transistors 2A, 2B, 2C and 2D are transistors which transfer the signal charges accumulated in the photoelectric conversion elements 1A, 1B, 1C and 1D to the charge storage unit FD. Turning-on and turning-off of the transfer transistors 2A, 2B, 2C and 2D are controlled by transfer pulses supplied from the vertical driving circuit 33A via the transfer lines 7A, 7B, 7C and 7D. The charge storage unit FD forms an input unit of the amplification transistor 4 and is a floating diffusion capacitor which temporarily stores and accumulates signal charges transferred from the photoelectric conversion elements 1A, 1B, 1C and 1D.

The reset transistor 3 is a transistor which resets the charge storage unit FD. Turning-on and turning-off of the reset transistor 3 are controlled by a reset pulse supplied from the vertical driving circuit 33A via the reset line 8. Resetting of the charge storage unit FD is to set a state (potential) of the charge storage unit FD to a reference state (a reference potential or a reset level) by controlling a charge amount accumulated in the charge storage unit FD. The reset transistor 3 and the transfer transistors 2A, 2B, 2C and 2D are turned on together, and thereby the photoelectric conversion elements 1A, 1B, 1C and 1D can be reset. The amplification transistor 4 is a transistor which outputs, from the other end thereof, an amplified signal obtained by amplifying a signal, input to the gate thereof, based on the signal charge accumulated in the charge storage unit FD. The selection transistor 5 is a transistor which selects the unit pixel cell 31 which outputs a signal to the vertical signal line 10A, and sends an output of the amplification transistor 4 to the vertical signal line 10A. Turning-on and turning-off of the selection transistor 5 are controlled by a selection pulse supplied from the vertical driving circuit 33A via the selection line 9. In the global shutter operation, the selection transistor 5 is turned off, and a path passing through the first substrate 101 and the second substrate 102 is selected as a path for reading a signal. In the rolling shutter operation, the selection transistor 5 is turned on, and a path passing through only the first substrate 101 is selected as a path for reading a signal.

The load transistor 12A is a transistor which is operated as a load of the amplification transistor 4, and supplies a current for driving the amplification transistor 4. A state of the load transistor 12A is controlled by a voltage signal supplied from the vertical driving circuit 33A via the load line 11A. The output terminal 6 outputs an amplified signal output from the amplification transistor 4 to the second substrate 102.

A single unit pixel cell 31 collecting four pixels is constituted by the photoelectric conversion elements 1A, 1B, 1C and 1D, the transfer transistors 2A, 2B, 2C and 2D, the reset transistor 3, the amplification transistor 4, and the selection transistor 5. The reset transistor 3, the amplification transistor 4, and the selection transistor 5 are shared by the four unit pixels 37.

Figure 5:
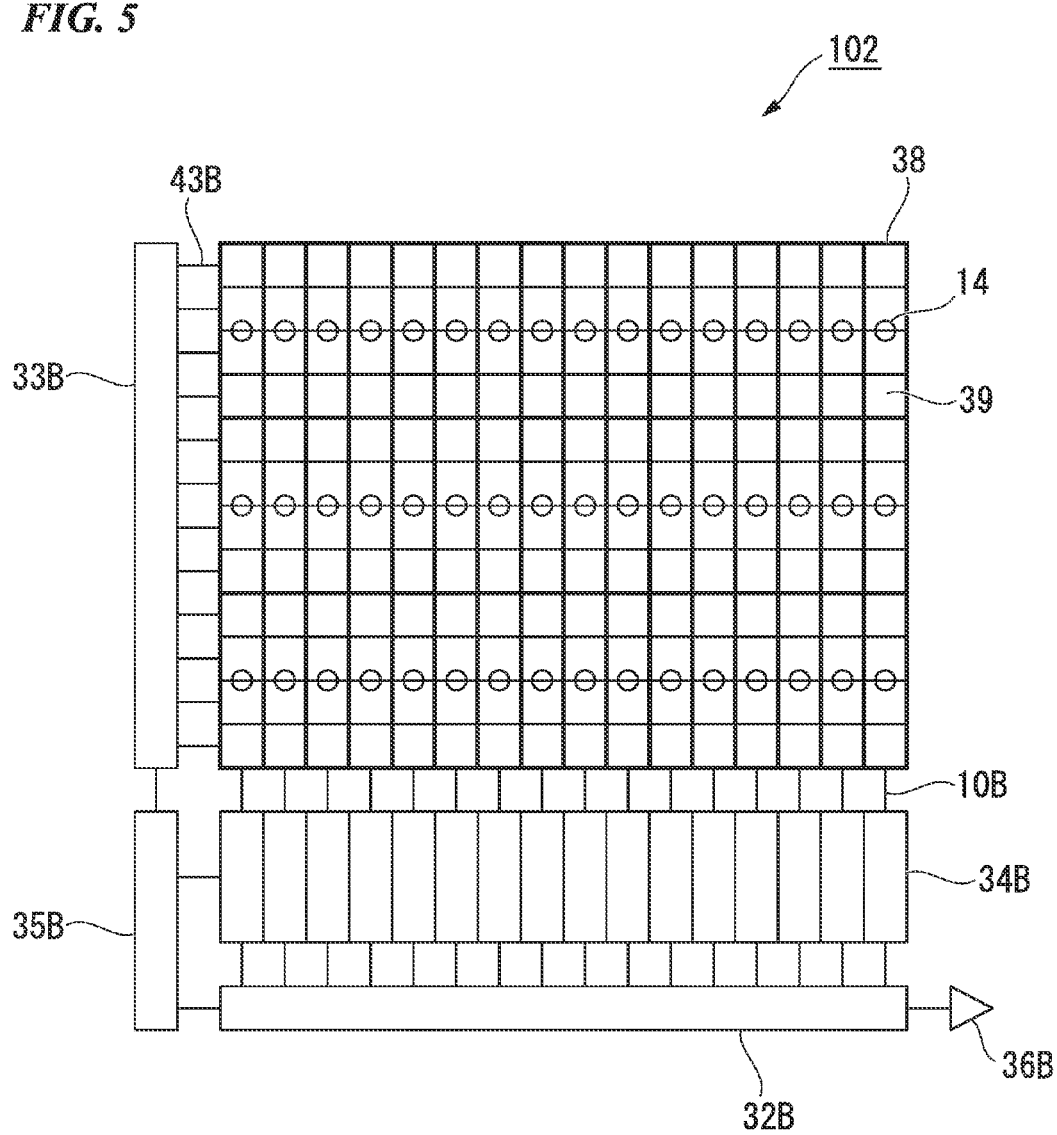
FIG. 5 is a block diagram illustrating a configuration of a second substrate included in the image pickup device in accordance with the first preferred embodiment of the present invention.

FIG. 5 shows a configuration of the second substrate 102. The second substrate 102 includes unit storage cells 38, a horizontal driving circuit 32B, a vertical driving circuit 33B, column circuit units 34B, a control circuit 35B, and an output circuit 36B.

The unit storage cell 38 has a plurality of unit storage units 39. In the example of the first preferred embodiment, the unit storage cell 38 includes four unit storage units 39 arranged in the vertical direction. The unit storage units 39 are disposed in a two-dimensional matrix and belong to any one of the unit storage cells 38 (groups). Each of the unit storage units 39 corresponds to each of the unit pixels 37. In the example of the first preferred embodiment, the unit pixels 37 and the unit storage units 39 are differentiated from each other; however, the unit pixels 37 and the unit storage units 39 may collectively form pixels. The arrangement of the unit storage units shown in FIG. 5 is an example, and the number of rows and the number of columns may be two or more.

The control circuit 35B receives an input clock or data for instructing an operation mode or the like from an external device of the second substrate 102, and supplies clocks or pulses required for operations of the following units in response to the received input clock or data. The vertical driving circuit 33B selects a row in the arrangement of the unit storage units 39, and supplies a control signal for an operation of the unit storage units 39 to the unit storage units 39 of the row via a control signal line 43B provided for each row. The vertical driving circuit 33B controls an operation of the unit storage units 39 by supplying a control signal to the unit storage units 39. Under the control of the vertical driving circuit 33B, the unit storage units 39 output a signal to a vertical signal line 10B provided for each column. The vertical signal line 10B outputs a signal read from the unit storage units 39 to the column circuit unit 34B provided for each column.

The column circuit unit 34B performs processes such as CDS, signal amplification, and AD conversion on the signal read to the vertical signal line 10B. The horizontal driving circuit 32B sequentially selects the column circuit units 34B and outputs signals processed by the column circuit units 34B from the output circuit 36B. The input terminals 14 will be described later.

Figure 6:
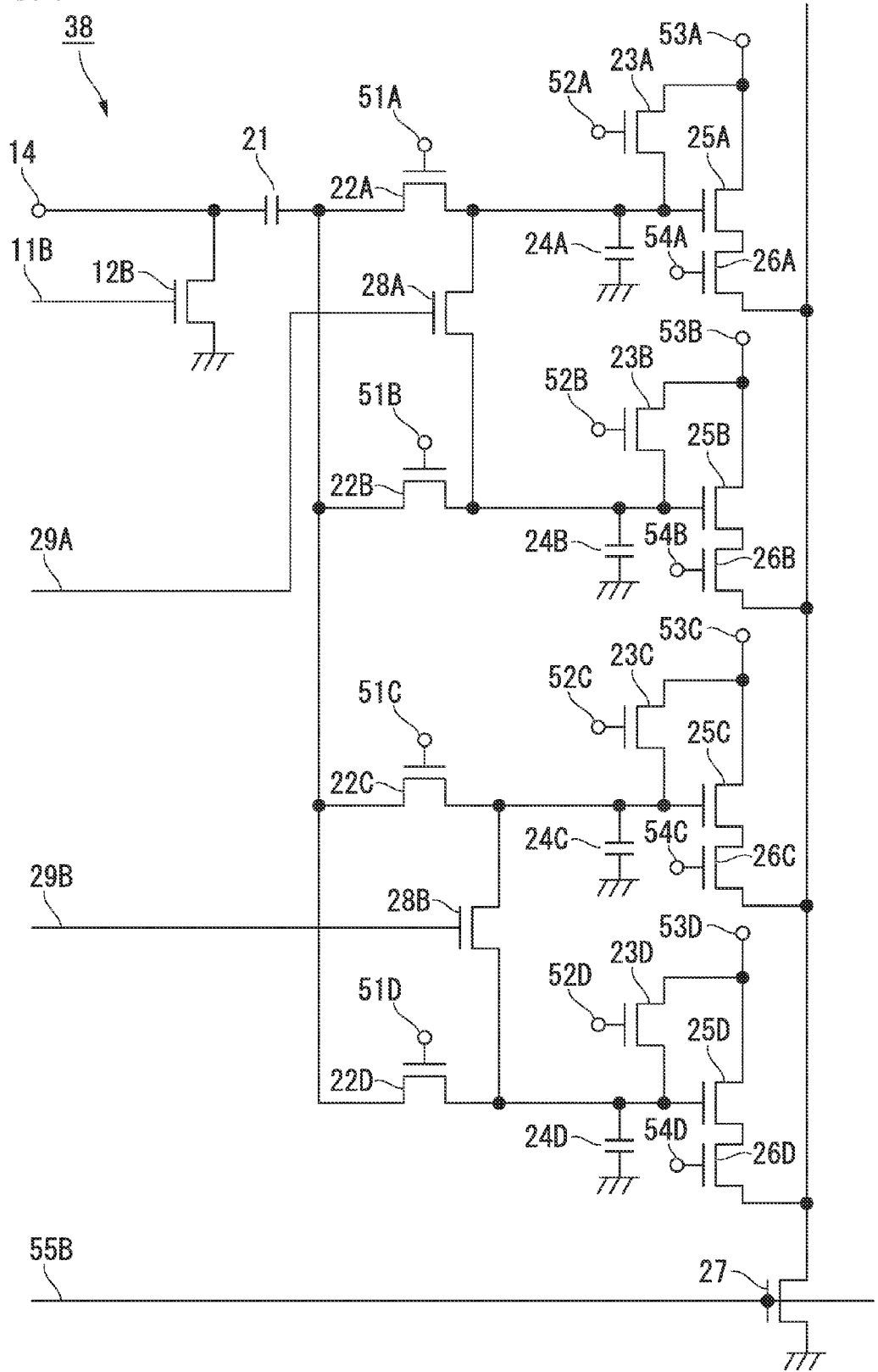
FIG. 6 is a circuit diagram illustrating a circuit configuration of a unit storage cell included in the image capturing unit of the image pickup device in accordance with the first preferred embodiment of the present invention.

FIG. 6 shows a circuit configuration in the unit storage cell 38 of the second substrate 102. The input terminal 14 is a terminal which is directly or indirectly connected to the output terminal 6 of the unit pixel cell 31, and is connected to one end of a load transistor 12B. The other end of the load transistor 12B is connected to the ground potential. A gate of the load transistor 12B is connected to a load line 11B.

One end of a clamp capacitor 21 is connected to the input terminal 14. First ends of sampling transistors 22A, 22B, 22C and 22D are connected to the other end of the clamp capacitor 21. Gates of the sampling transistors 22A, 22B, 22C and 22D are respectively connected to sampling lines 51A, 51B, 51C and 51D via which sampling pulses are supplied.

First ends of reset transistors 23A, 23B, 23C and 23D are respectively connected to power supply lines 53A, 53B, 53C and 53D, and second ends of the reset transistors 23A, 23B, 23C and 23D are respectively connected to second ends of the sampling transistors 22A, 22B, 22C and 22D. Gates of the reset transistors 23A, 23B, 23C and 23D are respectively connected to reset lines 52A, 52B, 52C and 52D.

First ends of analog memories 24A, 24B, 24C and 24D are respectively connected to the second ends of the sampling transistors 22A, 22B, 22C and 22D, and second ends of the analog memories 24A, 24B, 24C and 24D are connected to the ground potential. First ends of amplification transistors 25A, 25B, 25C and 25D are respectively connected to the power supply lines 53A, 53B, 53C and 53D. Gates of the amplification transistors 25A, 25B, 25C and 25D forming an input unit are respectively connected to the second ends of the sampling transistors 22A, 22B, 22C and 22D.

First ends of selection transistors 26A, 26B, 26C and 26D are respectively connected to the second ends of the amplification transistors 25A, 25B, 25C and 25D, and second ends of the selection transistors 26A, 26B, 26C and 26D are connected to the vertical signal line 10B. Gates of the selection transistors 26A, 26B, 26C and 26D are respectively connected to selection lines 54A, 54B, 54C and 54D via which selection pulses are supplied.

One end of the vertical signal line 10B is connected to one of a load transistor 27. The other end of the vertical signal line 10B is connected to the column circuit unit 34B. The load transistor 27 is provided for each column so as to correspond to the vertical signal line 10B. The other end of the load transistor 27 is connected to the ground potential. A gate of the load transistor 27 is connected to a load line 55B.

One end of an averaging transistor 28A is connected to the other end of the sampling transistor 22A, and the other end of the averaging transistor 28A is connected to the other end of the sampling transistor 22C. A gate of the averaging transistor 28A is connected to a sampling line 29A via which a sampling pulse is supplied.

One end of an averaging transistor 28B is connected to the other end of the sampling transistor 22B, and the other end of the averaging transistor 28B is connected to the other end of the sampling transistor 22D. A gate of the averaging transistor 28B is connected to a sampling line 29B via which a sampling pulse is supplied. The load line 11B, the sampling lines 51A, 51B, 51C and 51D, the reset lines 52A, 52B, 52C and 52D, the selection lines 54A, 54B, 54C and 54D, the load line 55B, and the sampling lines 29A and 29B constitute the control signal line 43B.

A signal which is output from the first substrate 101 is input to the input terminal 14. The load transistor 12B is a transistor which is operated as a load of the amplification transistor 4 and supplies a current for driving the amplification transistor 4 to the amplification transistor 4. A state of the load transistor 12B is controlled by a voltage signal supplied from the vertical driving circuit 33B via the load line 11B.

The clamp capacitor 21 is a capacitor which clamps (fixes) a voltage level of a signal output from the input terminal 14. The sampling transistors 22A, 22B, 22C and 22D are transistors which sample and hold a voltage level of the other end of the clamp capacitor 21 so as to be accumulated in the analog memories 24A, 24B, 24C and 24D. Turning-on and turning-off of the sampling transistors 22A, 22B, 22C and 22D are controlled by sampling pulses supplied from the vertical driving circuit 33B via the sampling lines 51A, 51B, 51C and 51D.

The reset transistors 23A, 23B, 23C and 23D are transistors which reset the analog memories 24A, 24B, 24C and 24D. Turning-on and turning-off of the reset transistors 23A, 23B, 23C and 23D are controlled by reset pulses supplied from the vertical driving circuit 33B via the reset lines 52A, 52B, 52C and 52D. Resetting of the analog memories 24A, 24B, 24C and 24D is to set states (potentials) of the analog memories 24A, 24B, 24C and 24D to a reference state (a reference potential or a reset level) by controlling a charge amount accumulated in the analog memories 24A, 24B, 24C and 24D. The analog memories 24A, 24B, 24C and 24D respectively store and accumulate analog signals sampled and held by the sampling transistors 22A, 22B, 22C and 22D.

A capacitance of each of the analog memories 24A, 24B, 24C and 24D is set to a capacitance larger than a capacitance of the charge storage unit FD. More preferably, a MIM (Metal Insulator Metal) capacitor or a MOS (Metal Oxide Semiconductor) capacitor in which a leakage current is small is used in the analog memories 24A, 24B, 24C and 24D. Thereby, resistance properties to noise are improved, and thus a high quality signal can be obtained.

The amplification transistors 25A, 25B, 25C and 25D are transistors which output, from the second ends thereof, amplified signals obtained by amplifying signals input to the gates thereof, based on signal charges accumulated in the analog memories 24A, 24B, 24C and 24D. The selection transistors 26A, 26B, 26C and 26D are transistors which select the unit storage units 39 and send outputs of the amplification transistors 25A, 25B, 25C and 25D to the vertical signal line 10B. Turning-on and turning-off of the selection transistors 26A, 26B, 26C and 26D are controlled by selection pulses supplied from the vertical driving circuit 33B via the selection lines 54A, 54B, 54C and 54D.

In the global shutter operation, the selection transistors 26A, 26B, 26C and 26D are turned on, and a path passing through the first substrate 101 and the second substrate 102 is selected as a path for reading a signal. In the rolling shutter operation, the selection transistors 26A, 26B, 26C and 26D are turned off, and a path passing through only the first substrate 101 is selected as a path for reading a signal.

The load transistor 27 is a transistor which is operated as a load of the amplification transistors 25A, 25B, 25C and 25D and supplies currents for driving the amplification transistors 25A, 25B, 25C and 25D. The state of the load transistor 27 is controlled by a voltage signal supplied from the vertical driving circuit 33B via the load line 55B.

The averaging transistor 28A performs an averaging process of averaging a signal charge accumulated in the analog memory 24A and a signal charge accumulated in the analog memory 24C. The averaging transistor 2813 performs an averaging process of averaging a signal charge accumulated in the analog memory 24B and a signal charge accumulated in the analog memory 24D. Turning-on and turning-off of the averaging transistors 28A and 28B are controlled by sampling pulses supplied from the vertical driving circuit 33B via the sampling lines 29A and 29B.

The unit storage cell 38 collecting four unit storage units 39 is constituted by the load transistor 12B, the clamp capacitor 21, the sampling transistors 22A, 22B, 22C and 22D, the reset transistors 23A, 23B, 23C and 23D, the analog memories 24A, 24B, 24C and 24D, the amplification transistors 25A, 25B, 25C and 25D, the selection transistors 26A, 26B, 26C and 26D, and the averaging transistors 28A and 28B. The load transistor 12B and the clamp capacitor 21 are shared by four unit storage units 39. The averaging transistors 28A and 28B are shared by two unit storage units 39.

Figure 7A:
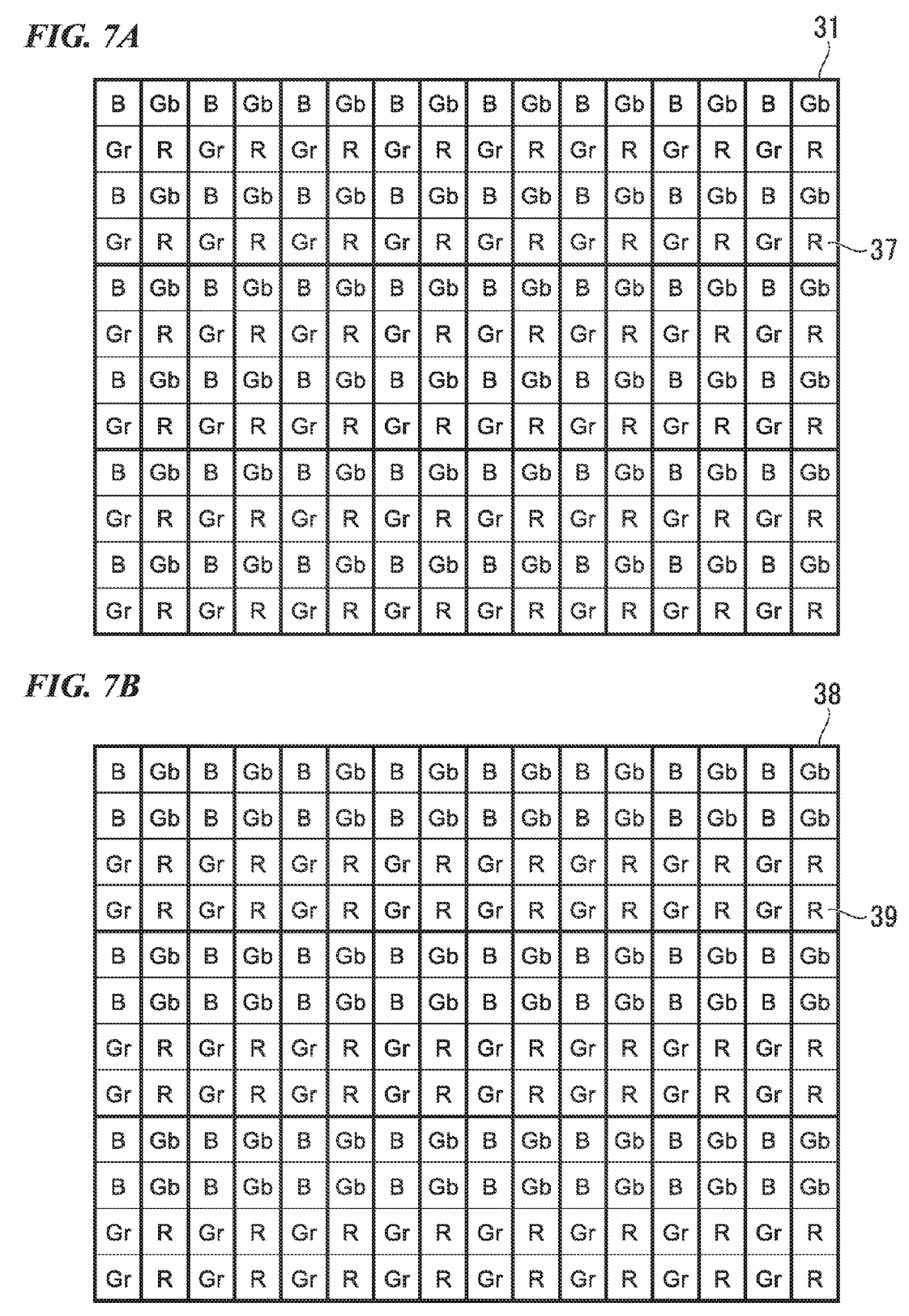

The arrangement of the unit pixels 37 in the unit pixel cell 31 and the unit storage units 39 in the unit storage cell 38 is a so-called Bayer arrangement where four unit pixels 37 and four unit storage units 39 respectively corresponding to red (R), green (Gr and Gb), and green (B) are used as the arrangement unit. FIG. 7A shows a correspondence relationship between the unit pixel 37 and each color, and FIG. 7B shows a correspondence relationship between the unit storage unit 39 and each color. As shown in FIG. 7A, a single unit pixel cell 31 includes two unit pixels 37 corresponding to B and two unit pixels 37 corresponding to Gr, or two unit pixels 37 corresponding to Gb and two unit pixels 37 corresponding to R. Similarly, as shown in FIG. 7B, a single unit storage cell 38 includes two unit storage units 39 corresponding to B and two unit storage units 39 corresponding to Gr, or two unit storage units 39 corresponding to Gb and two unit storage units 39 corresponding to R.

The arrangement of the respectively corresponding colors of the unit pixels 37 is different from the arrangement of the respectively corresponding colors of the unit storage units 39. For example, as shown in FIG. 7A, in the odd-numbered columns of the arrangement of the unit pixels 37, the unit pixel 37 corresponding to B and the unit pixel 37 corresponding to Gr are alternately disposed in the vertical direction, and, in the even-numbered columns of the arrangement of the unit pixels 37, the unit pixel 37 corresponding to Gb and the unit pixel 37 corresponding to R are alternately disposed in the vertical direction. On the other hand, as shown in FIG. 7B, in the odd-numbered columns of the arrangement of the unit storage units 39, two unit storage units 39 corresponding to B are disposed so as to be adjacent to each other in the vertical direction, and, further, two unit storage units 39 corresponding to Gr are disposed so as to be adjacent to each other in the vertical direction. In addition, in the even-numbered columns of the arrangement of the unit storage units 39, two unit storage units 39 corresponding to Gb are disposed so as to be adjacent to each other in the vertical direction, and, further, two unit storage units 39 corresponding to R are disposed so as to be adjacent to each other in the vertical direction.

The analog memories 24A and 24C shown in FIG. 6 correspond to the same color (in the example of FIG. 7B, B or Gb). In addition, the analog memories 24B and 24D shown in FIG. 6 correspond to the same color (in the example of FIG. 7B, Gr or R). Therefore, the averaging transistors 28A and 28B average signal charges accumulated in the two analog memories corresponding to the same color.

Next, with reference to FIG. 8, a description will be made of an operation (the global shutter operation) of the unit pixel cell 31 and the unit storage cell 38 in a case where a signal is read via both the first substrate 101 and the second substrate 102. FIG. 8 shows control signals supplied to the unit pixel cell 31 and the unit storage cell 38 supplied from the vertical driving circuits 33A and 33B in correlation with the reference numerals of the circuit elements to which the control signals are supplied. The operation shown in FIG. 8 shows an example where an averaging process of signal charges in the unit storage units 39 of two rows corresponding to the same color in the vertical direction is performed, thereby reducing the number of rows in the vertical direction for performing signal reading by half.

In the global shutter operation, since an operation of reading a signal to the vertical signal line 10A via the selection transistor 5 is not performed, a selection pulse from the vertical driving circuit 33A to the selection transistor 5 and a voltage signal from the vertical driving circuit 33A to the load transistor 12A are not supplied. In addition, a predetermined voltage is applied to the load transistor 12B from the vertical driving circuit 33B and thus a driving current is supplied to the amplification transistor 4.

Operation During Period T1

First, a reset pulse which is supplied from the vertical driving circuit 33A to the reset transistor 3 is varied from being at an "L" (Low) level to being at an "H" (High) level, and thereby the reset transistor 3 is turned on. At the same time, a transfer pulse which is supplied from the vertical driving circuit 33A to the transfer transistor 2A is varied from being at an "L" level to being at an "H" level, and thereby the transfer transistor 2A is turned on. Thereby, the photoelectric conversion element 1A is reset.

Next, the reset pulse which is supplied from the vertical driving circuit 33A to the reset transistor 3 and the transfer pulse which is supplied from the vertical driving circuit 33A to the transfer transistor 2A are varied from being at an "H" level to being at the "L" level, and thereby the reset transistor 3 and the transfer transistor 2A are turned off. Thereby, the reset of the photoelectric conversion element 1A finishes, and exposure (accumulation of a signal charge) of the photoelectric conversion element 1A starts. In the same manner as described above, the photoelectric conversion elements 1B, 1C and 1D are sequentially reset, and exposure of each photoelectric conversion element starts.

Operation During Period T2

Next, a reset pulse which is supplied from the vertical driving circuit 3313 to the reset transistor 23A is varied from being at an "L" level to being at an "H" level, and thereby the reset transistor 23A is turned on. Thereby, the analog memory 24A is reset. At the same time, a sampling pulse which is supplied from the vertical driving circuit 33B to the sampling transistor 22A is varied from being at an "L" level to being at an "H" level, and thereby the sampling transistor 22A is turned on. Thereby, the potential of the other end of the clamp capacitor 21 is reset to a power supply voltage, and the sampling transistor 22A starts sampling and holding the potential of the other end of the clamp capacitor 21.

Next, the reset pulse which is supplied from the vertical driving circuit 33A to the reset transistor 3 is varied from being at an "L" level to being at an "H" level, and thereby the reset transistor 3 is turned on. Thereby, the charge storage unit FD is reset. Next, the reset pulse which is supplied from the vertical driving circuit 33A to the reset transistor 3 is varied from being at an "H" level to being at an "L" level, and thereby the reset transistor 3 is turned off. Thereby, the reset of the charge storage unit FD finishes. The timing for resetting the charge storage unit FD may be within the exposure period; however, the charge storage unit FD is reset at the timing immediately before the exposure period finishes, and thereby it is possible to further reduce noise due to a leakage current of the charge storage unit FD.

Next, a reset pulse which is supplied from the vertical driving circuit 33B to the reset transistor 23A is varied from being at an "H" level to being at an "L" level, and thereby the reset transistor 23A is turned off. Thereby, the reset of the analog memory 24A finishes. The clamp capacitor 21 at this point clamps an amplified signal (an amplified signal after the charge storage unit FD is reset) output from the amplification transistor 4.

Operation During Period T3

First, a transfer pulse which is supplied from the vertical driving circuit 33A to the transfer transistor 2A is varied from being at an "L" level to being at an "H" level, and thereby the transfer transistor 2A is turned on. Thereby, the signal charge accumulated in the photoelectric conversion element 1A is transferred to the charge storage unit FD via the transfer transistor 2A and is accumulated in the charge storage unit FD. Thereby, the exposure (accumulation of a signal charge) of the photoelectric conversion element 1A finishes. The period from the exposure start of the photoelectric conversion element 1A in the period T1 to the exposure finish of the pixel region 1C in the period T3 is the exposure period (signal accumulation period). Next, the transfer pulse which is supplied from the vertical driving circuit 33A to the transfer transistor 2A is varied from being at an "H" level to being at an "L" level, and thereby the transfer transistor 2A is turned off.

Next, a sampling pulse which is supplied from the vertical driving circuit 33B to the sampling transistor 22A is varied from being at an "H" level to being at an "L" level, and thereby the sampling transistor 22A is turned off. Thereby, the sampling transistor 22A finishes sampling and holding the potential of the other end of the clamp capacitor 21.

Operation During Period T4

The above-described operations during the periods T2 and T3 are operations of the unit pixels 37 including the photoelectric conversion element 1A and the unit storage units 39 including the analog memory 24A. During the period T4, other unit pixels 37 and unit storage units 39 perform the same operations as the operations during the periods T2 and T3. In addition, in FIG. 8, the duration of the exposure period of each photoelectric conversion element is different due to the restriction of the space of the figure; however, the duration of the exposure period of each photoelectric conversion element is more preferably the same.

Hereinafter, a variation in the potential of one end of the analog memory 24A will be described. This is also the same for a variation in the potential of one end of each of the analog memories 24B, 24C and 24D. If a variation in the potential of one end of the charge storage unit FD due to transfer of a signal charge from the photoelectric conversion element 1A to the charge storage unit FD after the reset of the charge storage unit FD finishes is indicated by $\Delta Vfd$, and the gain of the amplification transistor 4 is indicated by $\alpha 1$, a variation $\Delta Vamp1$ in the potential of the other end of the amplification transistor 4 due to the transfer of the signal charge from the photoelectric conversion element 1A to the charge storage unit FD becomes $\alpha 1 \times \Delta Vfd$.

If a total gain of the analog memory 24A and the sampling transistor 22A is indicated by $\alpha 2$, a variation $\Delta Vmem$ in the potential of one end of the analog memory 24A due to the sampling and holding of the sampling transistor 22A after the signal charge is transferred from the photoelectric conversion element 1A to the charge storage unit FD becomes $\alpha 2 \times \Delta Vamp1$, that is, $\alpha 1 \times \alpha 2 \times \Delta Vfd$. $\Delta Vfd$ indicates a variation amount of the potential of one end of the charge storage unit FD due to the transfer of the signal charge and does not include reset noise generated due to the reset of the charge storage unit FD. Therefore, the sampling transistor 22A performs sampling and holding, and thereby it is possible to reduce the influence of noise generated by the first substrate 101.

Since the potential of one end of the analog memory 24A at the time point when the reset of the analog memory 24A finishes is the power supply voltage VDD, the potential Vmem of one end of the analog memory 24A which has been sampled and held by the sampling transistor 22A after the signal charge is transferred from the photoelectric conversion element 1A to the charge storage unit FD is given as in the following Expression (1). In Expression (1), $\Delta Vmem<0$, and $\Delta Vfd<0$.

$$Vmem=VDD+\Delta Vmem=VDD+\alpha 1 \times \alpha 2 \times \Delta Vfd \quad (1)$$

In addition, $\alpha 2$ is given as in the following Expression (2). In Expression (2), CL indicates a capacitance value of the clamp capacitor 21, and CSH indicates a capacitance value of the analog memory 24A. In order to further decrease reduction in gain, the capacitance CL of the clamp capacitor 21 is more preferably larger than the capacitance CSH of the analog memory 24A.

$$\alpha 2=CL/(CL+CSH) \quad (2)$$

Operation During Period T5

During the period T5, a sampling pulse which is supplied from the vertical driving circuit 33B to the averaging transistors 28A and 28B is varied from being at an "L" level to being at an "H" level, and thereby the averaging transistors 28A and 28B are turned on. Thereby, the potential of one end of the analog memory 24A becomes the same as the potential of one end of the analog memory 24C, and, further, the potential of one end of the analog memory 24B becomes the same as the potential of one end of the analog memory 24D. As a result, signal charges accumulated in the respective analog memories are averaged. This operation finishes when the sampling pulse which is supplied from the vertical driving circuit 33B to the averaging transistors 28A and 28B is varied from being at an "H" level to being at an "L" level.

Operation During Period T6

During the periods T6 and T7, signals based on the signal charges accumulated in the analog memories 24A and 24B are sequentially read for each row. However, a signal reading is not performed for the analog memories 24C and 24D. First, during the period T6, a signal is read from the unit storage unit 39 including the analog memory 24A. A selection pulse which is supplied from the vertical driving circuit 33B to the selection transistor 26A is varied from being at an "L" level to being at an "H" level, and thereby the selection transistor 26A is turned on. Thereby, a signal based on the potential Vmem shown in Expression (1) is output to the vertical signal line 10B via the selection transistor 26A.

Next, a reset pulse which is supplied from the vertical driving circuit 33B to the reset transistor 23A is varied from being at an "L" level to being at an "H" level, and thereby the reset transistor 23A is turned on. Thereby, the analog memory 24A is reset, and a signal based on the potential of one end of the analog memory 24A at the time of the reset is output to the vertical signal line 10B via the selection transistor 26A.

Next, the reset pulse which is supplied from the vertical driving circuit 33B to the reset transistor 23A is varied from being at an "H" level to being at an "L" level, and thereby the reset transistor 23A is turned off. Next, the selection pulse which is supplied from the vertical driving circuit 33B to the selection transistor 26A is varied from being at an "H" level to being at an "L" level, and thereby the selection transistor 26A is turned off.

The column circuit unit 34B generates a difference signal obtained by taking a difference between the signal based on the potential Vmem shown in Expression (1) and the signal based on the potential of one end of the analog memory 24A when the analog memory 24A is reset. The difference signal is a signal based on a difference between the potential Vmem shown in Expression (1) and the power supply voltage VDD, and is a signal based on a difference $\Delta V_{fd}$ between the potential of one end of the charge storage unit FD immediately after the signal charges accumulated in the photoelectric conversion elements 1A and 1C are transferred to the charge storage unit FD and the potential of the charge storage unit FD immediately after one end of the charge storage unit FD is reset. Therefore, it is possible to obtain a signal component, based on the signal charges accumulated in the photoelectric conversion elements 1A and 1C, which suppresses a noise component due to the reset of the analog memory 24A and a noise component due to the reset of the charge storage unit FD.

The signal output from the column circuit unit 34B is output from the output circuit 36B by the horizontal driving circuit 32B. As above, the signal reading from the unit storage unit 39 including the analog memory 24A finishes.

Operation During Period T7

Next, the same operation as the operation during the period T6 is performed for the unit storage unit 39 including the analog memory 24B.

In a typical global shutter operation, the charge storage unit FD is required to store a signal charge which is transferred from the photoelectric conversion element to the charge storage unit FD up to reading timing of each pixel. If noise occurs during the period when the charge storage unit FD stores the signal charge, the noise is superimposed on the signal charge stored by the charge storage unit FD, and thereby the signal quality (S/N) deteriorates.

Main factors of noise occurring during the period (hereinafter, referred to as a storage period) when the charge storage unit FD stores the signal charge are a charge (hereinafter, referred to as a leakage charge) due to a leakage current of the charge storage unit FD and a charge (hereinafter, referred to as a light charge) caused by light incident to units other than the photoelectric conversion element. If the leakage charge and the light charge occurring for the unit time are respectively indicated by qid and qpn, and the duration of the storage period is indicated by tc, a noise charge Qn occurring during the storage period becomes (qid+qpn) tc.

The capacitance of the charge storage unit FD is indicated by Cfd, the capacitance of the analog memory 24A is indicated by Cmem, and a ratio (Cmem/Cfd) of Cfd and Cmem is set to A. In addition, as described above, the gain of the amplification transistor 4 is indicated by $\alpha1$, and the total gain of the analog memory 24A and the sampling transistor 22A is indicated by $\alpha2$. If a signal charge generated by the photoelectric conversion element 1A during the exposure period is indicated by Qph, a signal charge stored in the analog memory 24A after the exposure period finishes becomes $A \times \alpha1 \times \alpha2 \times Qph$.

A signal based on the signal charge transferred from the photoelectric conversion element 1A to the charge storage unit FD is sampled and held by the sampling transistor 22A and is stored in the analog memory 24A. Therefore, the time after the signal charge is transferred to the charge storage unit FD until the signal charge is stored in the analog memory 24A is short, and noise occurring in the charge storage unit FD can be disregarded. Assuming that noise occurring during the period when the analog memory 24A stores the signal charge is Qn which is the same as described above, S/N becomes $A \times \alpha1 \times \alpha2 \times Qph/Qn$.

On the other hand, S/N becomes Qph/Qn in a case where a signal based on the signal charge stored in the charge storage unit FD is read to the vertical signal line 10A via the amplification transistor 4 and the selection transistor 5. Therefore, S/N in a case where a signal based on the signal charge stored in the charge storage unit FD is accumulated in the analog memory 24A and is then read to the vertical signal line 10B becomes $A \times \alpha1 \times \alpha2$ times greater than S/N in a case where the signal based on the signal charge stored in the charge storage unit FD is read to the vertical signal line 10A. It is possible to reduce deterioration in signal quality by setting a capacitance value of the analog memory 24A such that $A \times \alpha1 \times \alpha2$ is greater than 1 (for example, a capacitance value of the analog memory 24A is made to be sufficiently greater than a capacitance value of the charge storage unit FD). The above-described content is also the same for the analog memories 24B, 24C and 24D.

In the global shutter operation of the first preferred embodiment, the timings of operations of the unit pixel cells 31 and the unit storage cells 38 of which positions in the vertical direction (hereinafter, referred to as vertical positions) are the same are equal; however, the timings of operations of the unit pixel cells 31 and the unit storage cells 38 with different vertical positions are different. FIG. 9 schematically shows timings of operations of the unit pixel cells 31 and the unit storage cells 38 with different vertical positions (V1, V2, . . . , and Vn). The positions in the vertical direction of FIG. 9 indicate vertical positions in the arrangements of the unit pixel cells 31 and the unit storage cells 38, and the positions in the horizontal direction indicate temporal positions.

The reset period corresponds to the period T1 in FIG. 8, the signal transmission period corresponds to the periods T2, T3 and T4 in FIG. 8, and the averaging process period corresponds to the period T5 in FIG. 8, and the reading period corresponds to the periods T6 and T7 in FIG. 8.

As shown in FIG. 9, in the unit pixel cells 31 and the unit storage cells 38 with the different vertical positions, the reset periods, the signal transmission periods, and the averaging process periods are the same. On the other hand, in the unit pixel cells 31 and the unit storage cells 38 with the different vertical positions, the reading periods are different. In the above-described global shutter operation, although the exposure timing is different for each of the unit pixels 37 and the unit storage units 39 in the same unit pixel cell 31 and unit storage cell 38, synchronization of the exposure can be realized in all of the unit pixel cells 31 and unit storage cells 38.

In the first preferred embodiment, signal charges (signal charges generated by the four photoelectric conversion elements included in a single unit pixel cell 31) accumulated in the four analog memories included in a single unit storage cell 38 are averaging process targets by the averaging transistors 28A and 28B. In other words, signal charges generated by all the pixels are averaging process targets by the averaging transistors 28A and 28B. However, as shown in FIG. 8, only a signal based on signal charges accumulated in two analog memories of the four analog memories included in a single unit storage cell 38 is read. In addition, in each of different unit storage cells 38 with the same vertical position, a signal is read from the unit storage units 39 located in the same row.

As described above, signal charges accumulated in all the analog memories included in the unit storage cell 38 are not averaging process targets, but only signal charges accumulated in some analog memories included in the unit storage cell 38 may be averaging process targets. For example, only one of the two averaging transistors 28A and 28B may be provided.

Figure 10:
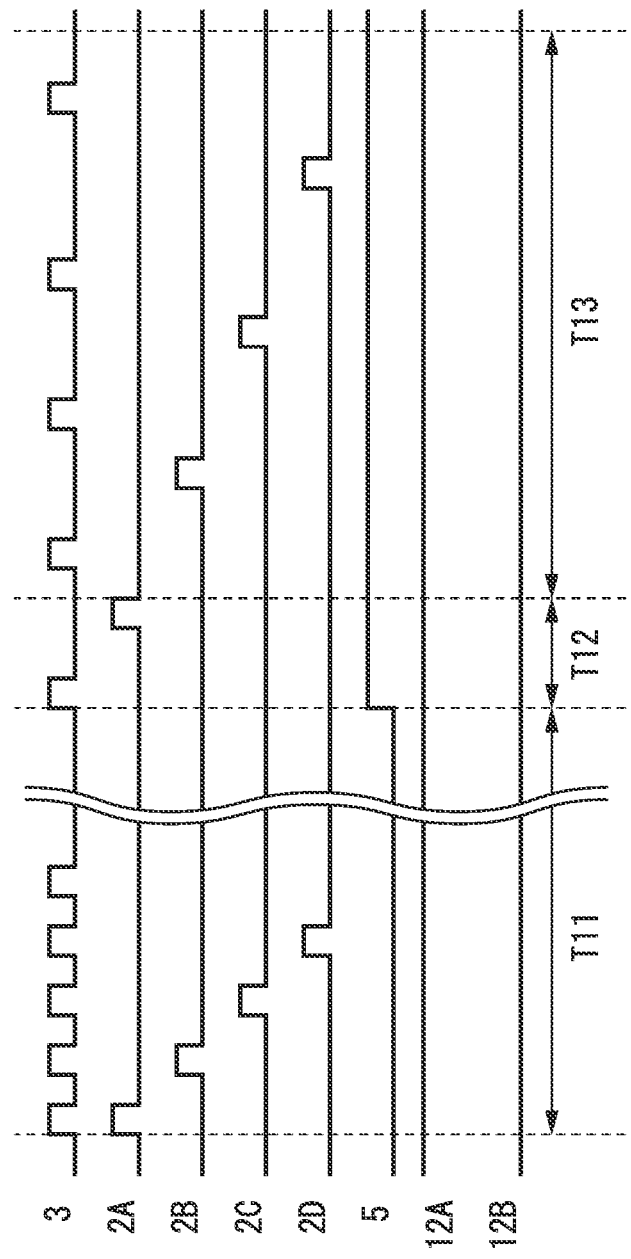
FIG. 10 is a timing chart illustrating an operation of the unit pixel cell included in the image capturing unit of the image pickup device in accordance with the first preferred embodiment of the present invention.

Next, with reference to FIG. 10, a description will be made of an operation (the rolling shutter operation) of the unit pixel cell 31 in a case where a signal is read via the first substrate 101. FIG. 10 shows control signals supplied to the unit pixel cell 31 and the unit storage cell 38 supplied from the vertical driving circuits 33A and 33B in correlation with the reference numerals of the circuit elements to which the control signals are supplied.

In the rolling shutter operation, since an operation where a signal is transmitted to the second substrate 102 from the first substrate 101, and the signal is read to the vertical signal line 10B via the selection transistors 26A, 26B, 26C and 26D is not performed, selection pulses (not shown) from the vertical driving circuit 33B to the selection transistors 26A, 26B, 26C and 26D and a voltage signal from the vertical driving circuit 33B to the load transistor 12B are not supplied. In addition, a predetermined voltage is applied to the load transistor 12A from the vertical driving circuit 33A and thus a driving current is supplied to the amplification transistor 4.

Operation During Period T11

First, a reset pulse which is supplied from the vertical driving circuit 33A to the reset transistor 3 is varied from being at an "L" (Low) level to being at an "H" (High) level, and thereby the reset transistor 3 is turned on. At the same time, a transfer pulse which is supplied from the vertical driving circuit 33A to the transfer transistor 2A is varied from being at an "L" level to being at an "H" level, and thereby the transfer transistor 2A is turned on. Thereby, the photoelectric conversion element 1A is reset.

Next, the reset pulse which is supplied from the vertical driving circuit 33A to the reset transistor 3 and the transfer pulse which is supplied from the vertical driving circuit 33A to the transfer transistor 2A are varied from being at an "H" level to being at an "L" level, and thereby the reset transistor 3 and the transfer transistor 2A are turned off. Thereby, the reset of the photoelectric conversion element 1A finishes, and exposure (accumulation of a signal charge) of the photoelectric conversion element 1A starts. In the same manner as described above, the photoelectric conversion elements 1B, 1C and 1D are sequentially reset, and exposure of each photoelectric conversion element starts.

Operation During Period T12

During the period T12, the signal charges accumulated in the photoelectric conversion elements 1A, 1B, 1C and 1D are transferred to the charge storage unit FD, and signals based on the signal charges accumulated in the charge storage unit FD are sequentially read for each row. First, a signal is read from the unit pixel 37 including the photoelectric conversion element 1A. A selection pulse which is supplied from the vertical driving circuit 33A to the selection transistor 5 is varied from being at an "L" level to being at an "H" level, and thereby the selection transistor 5 is turned on. At the same time, the reset pulse which is supplied from the vertical driving circuit 33A to the reset transistor 3 is varied from being at an "L" level to being at an "H" level, and thereby the reset transistor 3 is turned on. Thereby, the charge storage unit FD is reset, and a signal based on the potential of charge storage unit FD at the time of the reset is output to the vertical signal line 10A via the selection transistor 5. Next, the reset pulse which is supplied from the vertical driving circuit 33A to the reset transistor 3 is varied from being at an "H" level to being at an "L" level, and thereby the reset transistor 3 is turned off.

Next, the transfer pulse which is supplied from the vertical driving circuit 33A to the transfer transistor 2A is varied from being at an "L" level to being at an "H" level, and thereby the transfer transistor 2A is turned on. Thereby, the signal charge accumulated in the photoelectric conversion element 1A is transferred to the charge storage unit FD via the transfer transistor 2A and is accumulated in the charge storage unit FD. Thereby, the exposure (accumulation of a signal charge) of the photoelectric conversion element 1A finishes. The period from the exposure start of the photoelectric conversion element 1A in the period T11 to the exposure finish of the photoelectric conversion element 1A in the period T12 is the exposure period (signal accumulation period). Since the selection transistor 5 is turned on, a signal based on the potential of the charge storage unit FD is output to the vertical signal line 10A via the selection transistor 5. Next, the transfer pulse which is supplied from the vertical driving circuit 33A to the transfer transistor 2A is varied from being at an "H" level to being at an "L" level, and thereby the transfer transistor 2A is turned off.

The column circuit unit 34A generates a difference signal obtained by taking a difference between the signal based on the potential of the charge storage unit FD immediately after the signal charge is transferred from the photoelectric conversion element 1A to the charge storage unit FD and the signal based on the potential of the charge storage unit FD when the charge storage unit FD is reset. Therefore, it is possible to obtain a signal component, based on the signal charge accumulated in the photoelectric conversion element 1A, which suppresses a noise component due to the reset of the charge storage unit FD.

The signal output from the column circuit unit 34A is output from the output circuit 36A by the horizontal driving circuit 32A. As above, the signal reading from the unit pixel 37 including the photoelectric conversion element 1A finishes.

Operation During Period T13

Next, the same operation as the operation during the period T12 is performed for each unit pixel 37 including the photoelectric conversion elements 1B, 1C and 1D.

Figure 11:
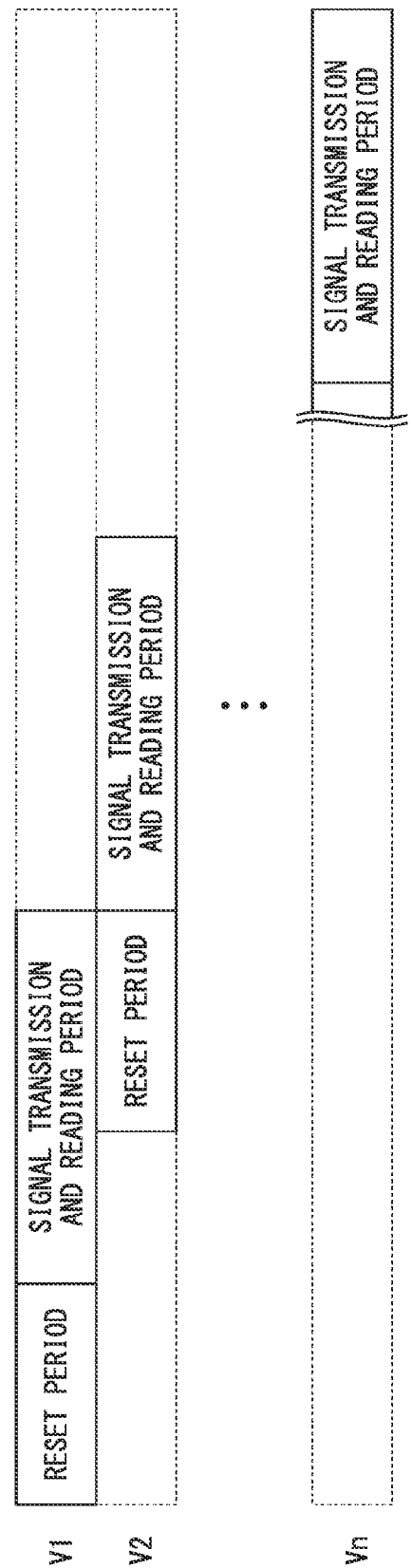
FIG. 11 is a timing chart illustrating an operation of the unit pixel cell included in the image capturing unit of the image pickup device in accordance with the first preferred embodiment of the present invention.
Figure 12:
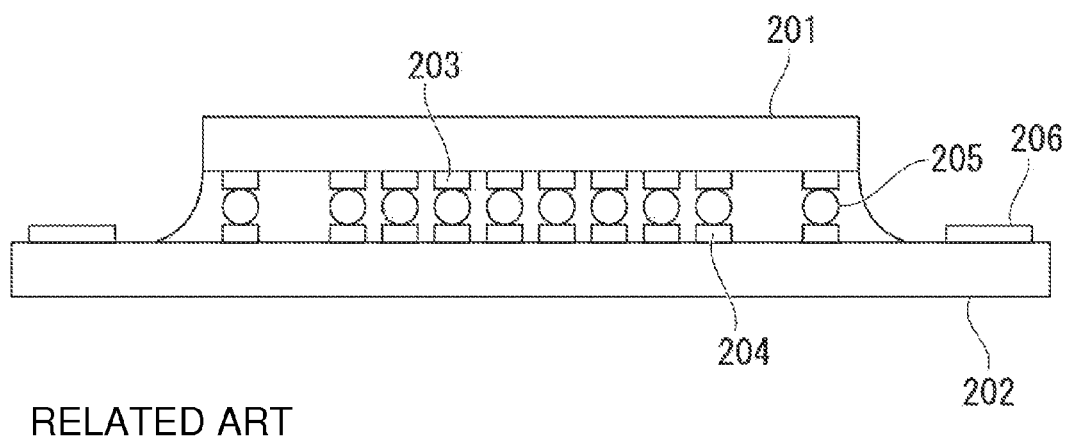
FIG. 12 is a cross-sectional view illustrating a configuration of a solid-state image pickup device in accordance with the related art.
Figure 13:
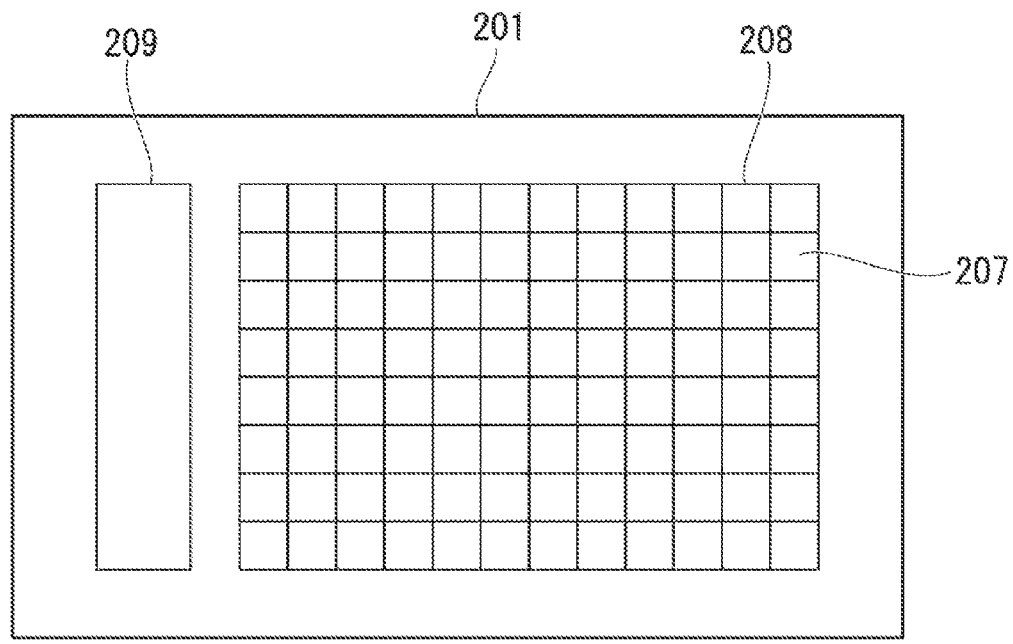
FIG. 13 is a configuration diagram illustrating a configuration of a first substrate included in the solid-state image pickup device in accordance with the related art.
Figure 14:
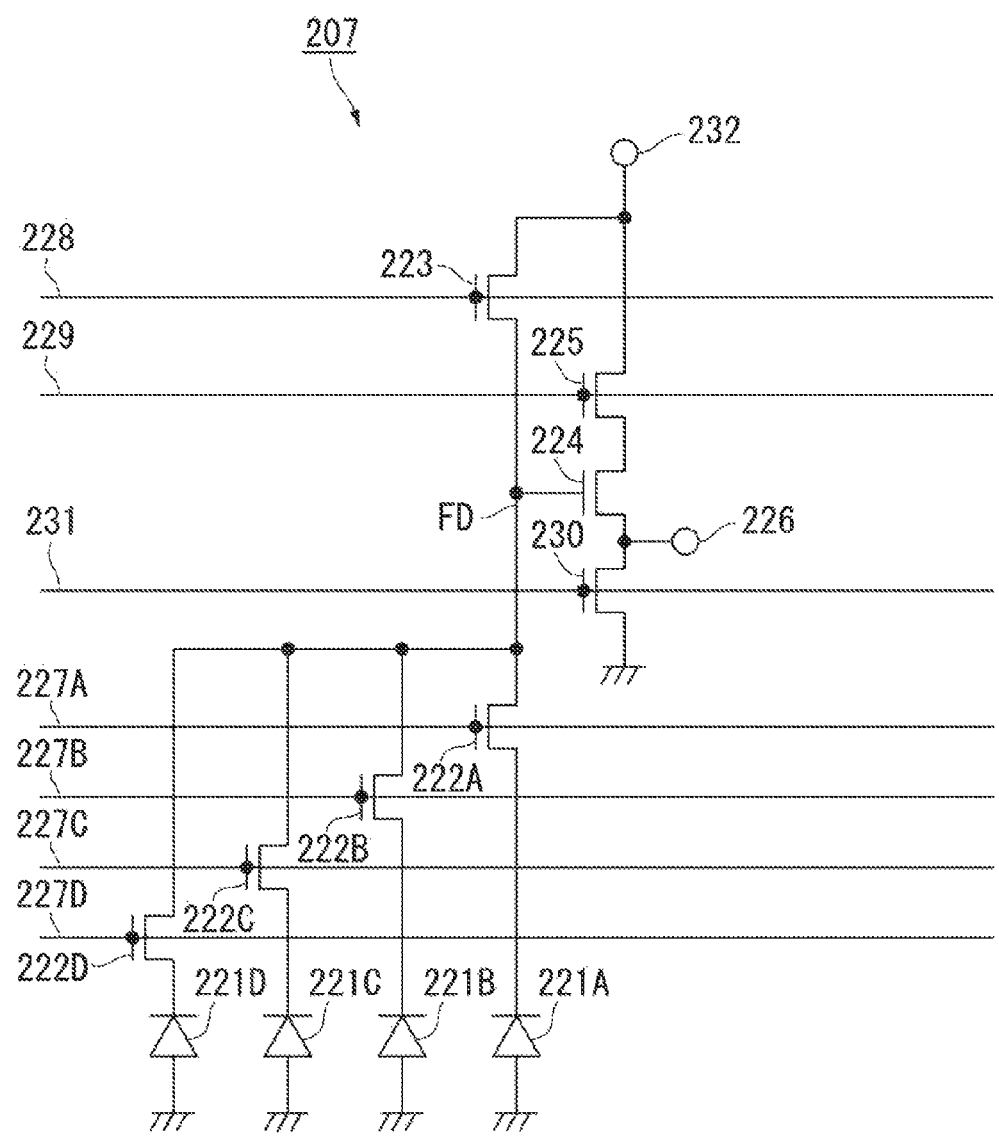
FIG. 14 is a circuit diagram illustrating a circuit configuration of a pixel cell of the first substrate included in the solid-state image pickup device in accordance with the related art.
Figure 15:
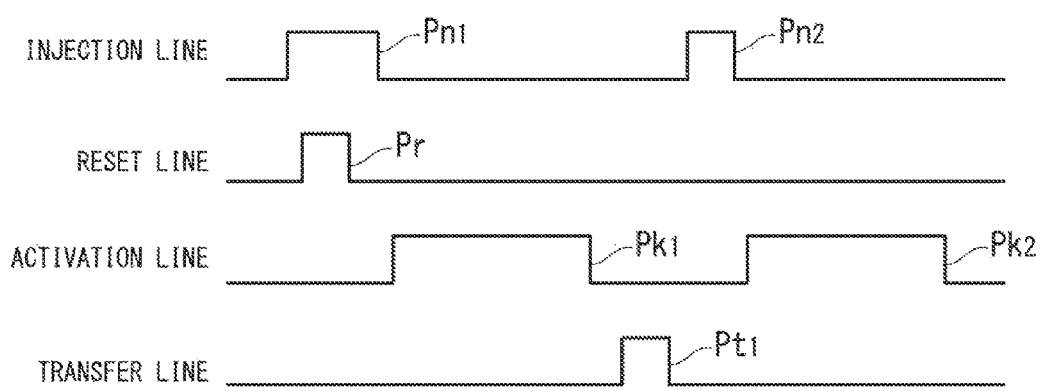
FIG. 15 is a timing chart illustrating an operation of pixels included in the solid-state image pickup device in accordance with the related art.

In the rolling shutter operation of the first preferred embodiment, the timings of operations of the unit pixel cells 31 with the same vertical position are the same; however, the timings of operations of the unit pixel cells 31 with different vertical positions are different. FIG. 11 schematically shows timings of operations of the unit pixel cells 31 with different vertical positions (V1, V2, . . . , and Vn). The positions in the vertical direction of FIG. 11 indicate vertical positions in the arrangement of the unit pixel cells 31, and the positions in the horizontal direction indicate temporal positions.

The reset period corresponds to the period T11 in FIG. 10, and the signal transmission and reading period corresponds to the periods T12 and T13 in FIG. 10. As shown in FIG. 11, in the unit pixel cells 31 with the different vertical positions, the signal transmission and reading periods do not overlap. In the above-described rolling shutter operation, although the exposure timing is different for each of the unit pixel cells 31 with the different vertical positions, it is possible to realize synchronization of the exposure by using a mechanical shutter (not shown). In addition, in the rolling shutter operation, only the first substrate 101 is operated, and thus only the first substrate 101 can be used singly in a state where the second substrate 102 is not connected thereto.

As described above, according to the first preferred embodiment, by averaging signals (signal charges) accumulated in the signal accumulation circuits (the analog memories 24A, 24B, 24C and 24D) respectively included in two or more pixels which are averaging targets, it is possible to suppress occurrence of moiré in an image formed by the respective signals output from the pixels. In addition, by performing the averaging, it is possible to reduce a random noise component included in a signal. Therefore, according to the first preferred embodiment, it is possible to reduce a deterioration in image quality.

In the first preferred embodiment, two unit storage units 39 corresponding to the same color are adjacent to each other in the vertical direction (column direction), and signal charges accumulated in the analog memories of the two unit storage units 39 are averaged. As such, by averaging signal charges of pixels adjacent to each other in the vertical direction, it is possible to simplify the layout of the averaging transistors 28A and 28B. In addition, even if crosstalk occurs between the two unit storage units 39 corresponding to the same color, adjacent to each other, it is possible to reduce deterioration in image quality due to crosstalk as compared with a case where crosstalk occurs between two unit storage units 39 corresponding to different colors.

In the first preferred embodiment, in the unit storage cell 38, an averaged signal is output only from two unit storage units 39 of four unit storage units 39 arranged in the vertical direction. Thereby, since the number of rows in the vertical direction for reading a signal is a half of the number of rows of the pixel arrangement, as compared with a case of reading a signal of pixels of all the rows, it is possible to read a signal at high speed and to thereby reduce power consumption.

In the first preferred embodiment, in a plurality of unit storage cells 38 located at the same vertical position, a signal is read from the unit storage units 39 in the same row. For this reason, control for reading an averaged signal can be performed for each row, and thus control related to reading of a signal is facilitated. In addition, as shown in FIG. 9, after signal charges are accumulated in the analog memories 24A, 24B, 24C and 24D, the accumulated signal charges are averaged at the same timing, and thereby control related to averaging of signals is facilitated.

In the first preferred embodiment, circuit elements required to read signals according to a plurality of reading methods (a global shutter method and a rolling shutter method in the first preferred embodiment) are disposed in a plurality of substrates, and circuit elements required to read signals according to at least one reading method (a rolling shutter method in the first preferred embodiment) are disposed in a substrate (the first substrate 101 in the first preferred embodiment) of the plurality of substrates. Thereby, signals can be read from pixels of a solid-state image pickup device having a plurality of substrates according to a plurality of reading methods, and signals can be read using only a single substrate according to at least one reading method of a plurality of reading methods.

In addition, the first substrate 101 is used singly, and thereby it is possible to implement a solid-state image pickup device supporting the rolling shutter operation or a camera using the solid-state image pickup device. In addition, a solid-state image pickup device is formed by overlapping the first substrate 101 manufactured for the rolling shutter operation with the second substrate 102, and thereby it is possible to implement a solid-state image pickup device supporting the global shutter operation or a camera using the solid-state image pickup device.

In addition, it is possible to reduce deterioration in signal quality by providing the analog memories 24A, 24B, 24C and 24D. Particularly, by setting capacitance values of the analog memories 24A, 24B, 24C and 24D to values larger than a capacitance value of the charge storage unit FD (for example, by setting capacitance values of the analog memories 24A, 24B, 24C and 24D to values which are five times larger than a capacitance value of the charge storage unit FD), an amount of signal charges stored by the analog memories 24A, 24B, 24C and 24D is larger than an amount of signal charges stored by the charge storage unit FD. For this reason, it is possible to decrease the influence of signal deterioration due to leakage currents of the analog memories 24A, 24B, 24C and 24D.

In addition, it is possible to reduce noise occurring in the first substrate 101 by providing the clamp capacitor 21 and the sampling transistors 22A, 22B, 22C and 22D. The noise occurring in the first substrate 101 includes noise (for example, reset noise) occurring in the input unit of the amplification transistor 4 due to an operation of a circuit (for example, the reset transistor 3) connected to the amplification transistor 4, noise caused by operation characteristics of the amplification transistor 4 (for example, noise caused by variations in circuit threshold values of the amplification transistor 4), and the like.

In addition, signals when the analog memories 24A, 24B, 24C and 24D are reset and signals responding to variations in the outputs of the amplification transistor 4 generated by transferring signal charges from the photoelectric conversion elements 1A, 1B, 1C and 1D to the charge storage unit FD are output in a time-divisional manner, and a difference process is performed for each signal, thereby reducing noise occurring in the second substrate 102. The noise occurring in the second substrate 102 includes noise (for example, reset noise) occurring in the input units of the amplification transistors 25A, 25B, 25C and 25D due to operations of circuits (for example, the reset transistors 23A, 23B, 23C and 23D) connected to the amplification transistors 25A, 25B, 25C and 25D, and the like.

The signal accumulation circuits and capacitors related to the present invention correspond to, for example, the analog memories 24A, 24B, 24C and 24D. The averaging circuit and the cell connection circuit related to the present invention correspond to, for example, the averaging transistors 28A and 28B. The output circuits related to the present invention correspond to, for example, the selection transistors 5, 26A, 26B, 26C and 26D.

The control unit related to the present invention corresponds to, for example, the vertical driving circuit 33B. The first connection circuits related to the present invention correspond to, for example, the transfer transistors 2A, 2B, 2C and 2D and the amplification transistor 4. The second connection circuits related to the present invention correspond to, for example, the clamp capacitor 21 and the sampling transistors 22A, 22B, 22C and 22D.

For example, although, in the first preferred embodiment, the unit pixel cell and the unit storage cell respectively include one pixel in the horizontal direction and four pixels in the vertical direction, and an averaging process of two pixels, corresponding to the same pixel, with different vertical positions is performed, the number of unit pixels included in the unit pixel cell and the number of unit storage units included in the unit storage cell are arbitrary. In addition, although, in the first preferred embodiment, an averaging process on two pixels, corresponding to the same pixel, with different vertical positions is performed, pixels, corresponding to the same color, which are targets of the averaging process, may be three pixels or five pixels with different vertical positions, three pixels or five pixels with different horizontal positions, or a total of nine pixels including three pixels with different horizontal positions×three pixels with different vertical positions. Further, an averaging process may be performed on two pixels adjacent in the vertical direction or two pixels adjacent in the horizontal direction using a monochrome type image capturing element, and, there is no limitation in whether or not there is a color filter or in an arrangement of pixels on which an averaging process is performed.

Although, in the above description, a configuration of the solid-state image pickup device where two substrates are connected by the connection unit has been described, three or more substrates may be connected by the connection unit. In a case where three or more substrates are connected by the connection unit, two of the three or more substrates correspond to the first substrate and the second substrate.

For example, according to an aspect of the present invention, there is provided a solid-state image pickup device in which a first substrate and a second substrate including circuit elements forming pixels and disposed therein are electrically connected by a connection unit, including averaging means for averaging signals accumulated in signal accumulation means respectively included in the two or more pixels which are pixels included in the same group and are averaging targets; and output means for outputting the averaged signals from the pixels, wherein the pixels are classified into a plurality of groups and each group includes the plurality of pixels, and wherein the pixels include photoelectric conversion means disposed in the first substrate; and the signal accumulation means disposed in the second substrate for accumulating signals which are generated by the photoelectric conversion means and are input via the connection unit.

For example, according to an aspect of the present invention, there is provided an image pickup device including a solid-state image pickup device in which a first substrate and a second substrate including circuit elements forming pixels and disposed therein are electrically connected by a connection unit, wherein the solid-state image pickup device includes averaging means for averaging signals accumulated in signal accumulation means respectively included in the two or more pixels which are pixels included in the same group and are averaging targets; and output means for outputting the averaged signals from the pixels, wherein the pixels are classified into a plurality of groups and each group includes the plurality of pixels, and wherein the pixels include photoelectric conversion means disposed in the first substrate; and the signal accumulation means disposed in the second substrate for accumulating signals which are generated by the photoelectric conversion means and are input via the connection unit.

A computer program product which realizes any combination of the above-described respective constituent elements or process procedures is also regarded as an aspect of the present invention. The computer program product refers to a storage media, a device or a system including program code, such as a storage media (a DVD medium, a hard disk medium, a memory medium, or the like) on which program code is recorded, a computer on which program code is recorded, or an Internet system (for example, a system including a server and a client terminal) on which program code are recorded. In this case, the above-described respective constituent elements or process procedures are implemented as modules, and program codes formed from the implemented modules are recorded in the computer program product.

For example, according to an aspect of the present invention, there is provided a computer program product that records therein program codes causing a computer to execute a process of reading signals from pixels of a solid-state image pickup device in which a first substrate and a second substrate including circuit elements forming the pixels and disposed therein are electrically connected by a connection unit, the pixels are classified into a plurality of groups each of which includes the plurality of pixels, and the pixels include photoelectric conversion elements disposed in the first substrate and signal accumulation circuits disposed in the second substrate and accumulating signals which are generated by the photoelectric conversion elements and are input via the connection unit, the program codes including a module that causes the photoelectric conversion elements to generate signals; a module that inputs the signals generated by the photoelectric conversion elements to the signal accumulation circuits via the connection unit; a module that averages signals accumulated in signal accumulation circuits respectively included in the two or more pixels which are pixels included in the same group and are averaging targets; and a module that outputs the averaged signals from the pixels.

A program for realizing any combination of the above-described respective constituent elements or process procedures in accordance with the first preferred embodiment is also regarded as an aspect of the present invention. The program is recorded on a computer readable storage media, and the program recorded on the storage media is read and executed by a computer, thereby achieving the object of the present invention.

Here, the "computer" also includes home page provision environment (or display environment) if the WWW system is used. Further, the "computer readable storage media" refers to a portable medium such as a flexible disk, a magneto-optical disc, a ROM or a CD-ROM, or a storage device such as a hard disk built into in a computer. Furthermore, the "computer readable storage media" also includes a medium which holds a program for a specific time, such as a volatile memory (RAM) inside a computer system which is a server or a client in a case where the program is transmitted via a network such as the Internet or a communication line such as a telephone line.

In addition, the program may be transmitted from a computer where the program is stored in a storage device to other computers via a transmission medium or using a transmission wave in the transmission medium. Here, the "transmission medium" transmitting the program refers to a medium having a function of transmitting information, such as, for example, a network (communication network) such as the Internet or a communication line such as a telephone line. Further, the program may realize some of the above-described functions. Furthermore, the program may be a so-called difference file (difference program) which can realize the above-described functions in combination with a program which has already been recorded in a computer.

Although the preferred embodiment of the present invention has been described as above, various alterations, modifications, and equivalents may be used as the above-described respective constituent elements or process procedures. In the embodiment disclosed in the present specification, in order to execute one or a plurality of functions, a single component may be replaced with a plurality of components, or a plurality of components may be replaced with a single component. This replacement is included in the scope of the present invention except for a case where the replacement does not appropriately work on achieving the object of the present invention. Therefore, the scope of the present invention is not determined by referring to the above description but should be determined based on the claims, and includes the whole scope of the equivalents. In the claims, each constituent element includes one or more elements unless obviously expressed. In the claims, the claims should not be construed as including the means-plus-function limitation unless obviously recited using the words "means for ~".

The terminology used in the present specification only aims at describing a specific embodiment and is not intended to limit the present invention. In the present specification, even in a case where the terminology is used in the singular form, the terminology also includes the plural form unless excluding the plural form is obviously expressed in the context.

As used herein, the following directional terms "forward, rearward, above, downward, right, left, vertical, horizontal, below, transverse, row and column" as well as any other similar directional terms refer to those directions of an apparatus equipped with the present invention. Accordingly, these terms, as utilized to describe the present invention should be interpreted relative to an apparatus equipped with the present invention.

The term "configured" is used to describe a component, unit or part of a device includes hardware and/or software that is constructed and/or programmed to carry out the desired function.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A solid-state image pickup device in which a first substrate and a second substrate including circuit elements forming pixels and disposed therein are electrically connected by a connection unit, comprising:
    an averaging circuit that averages signals accumulated in signal accumulation circuits respectively included in the two or more pixels that are pixels included in the same group and are averaging targets; and
    an output circuit that outputs the averaged signals from the pixels, wherein
    the pixels are classified into a plurality of groups and each group includes the plurality of pixels, and
    the pixels comprises:
        photoelectric conversion elements disposed in the first substrate;
        the signal accumulation circuits that are disposed in the second substrate and accumulate signals that are generated by the photoelectric conversion elements and are input via the connection unit; and:
    a control unit that controls the output circuit such that the averaged signals are output from some pixels of the pixels that are averaging targets, and the averaged signals are not output from the other pixels of the pixels that are averaging targets.

2. The solid-state image pickup device according to claim 1, wherein
    the pixels are arranged in a matrix, and
    the control unit selects the pixels that are output targets of the averaged signals from the plurality of pixels arranged in the same row for each group forming the plurality of groups.

3. The solid-state image pickup device according to claim 1, wherein
    the photoelectric conversion elements respectively included in all the pixels that are averaging targets generate signals.

4. The solid-state image pickup device according to claim 1, wherein
    each of the pixels corresponds to a predetermined color, and
    the averaging circuit averages signals accumulated in the signal accumulation circuits respectively included in the two or more pixels that are pixels, corresponding to the same color, included in the same group and are averaging targets.

5. The solid-state image pickup device according to claim 1, wherein
    the averaging circuit averages accumulated signals at timing after the signals are accumulated in the signal accumulation circuits respectively included in the two or more pixels that are pixels included in the same group and are averaging targets.

6. The solid-state image pickup device according to claim 5, wherein,
    after the signals are accumulated in the signal accumulation circuits, the averaging circuit averages the accumulated signals between different groups at the same timing.

7. The solid-state image pickup device according to claim 1, wherein
    the averaging circuit is disposed in the second substrate.

8. The solid-state image pickup device according to claim 1, wherein
    the two or more pixels included in the same group share the single connection unit.

9. The solid-state image pickup device according to claim 8, wherein
    the pixels are arranged in a matrix, and
    each group comprises the plurality of pixels arranged in the same column.

10. The solid-state image pickup device according to claim 1, wherein
    the output circuit can be operated so as to switch between a first mode in which the averaged signals are output and a second mode in which signals generated by the photoelectric conversion elements are output without being averaged.

11. A solid-state image pickup device in which a first substrate and a second substrate including circuit elements forming pixels and disposed therein are electrically connected by a connection unit, comprising:
an averaging circuit that is connected to capacitors respectively included in the two or more pixels that are pixels included in the same group and are averaging targets, and averages signals accumulated in the capacitors; and
an output circuit that is connected to the averaging circuit and outputs the averaged signals from the pixels, wherein
the pixels are classified into a plurality of groups and each group includes the plurality of pixels, and
the pixels comprises:
photoelectric conversion elements disposed in the first substrate;
a first connection circuit that is disposed in the first substrate and connects the photoelectric conversion elements to the connection unit;
the capacitors that are disposed in the second substrate and accumulate signals generated by the photoelectric conversion elements; and
a second connection circuit that is disposed in the second substrate and connects the connection unit to the capacitors.

12. A solid-state image pickup device comprising:
a first substrate that includes:
a plurality of photoelectric conversion elements arranged in matrix, each of the plurality of photoelectric conversion element generating a charge signal corresponding to an incident light; and
a plurality of first micro pads, each of the plurality of first micro pads connecting to at least one of the plurality of photoelectric conversion elements;
a second substrate that includes:
a plurality of capacitors, each of the plurality of capacitors corresponding to one of the plurality of photoelectric conversion elements, each of the plurality of capacitors storing a voltage signal corresponding to the charge signal; and
a plurality of second micro pads, each of the plurality of second micro pads opposing to corresponding one of the plurality of first micro pads, each of the plurality of second micro pads connecting to at least one of the plurality of capacitors;
a plurality of switching transistor, each of the plurality of switching transistor connected between corresponding two of the plurality of capacitors, each of the plurality of switching transistor conduct the corresponding two of the plurality of capacitors according to an averaging signal; and
a plurality of conductive materials, each of the plurality of conductive materials connected between corresponding one of the plurality of first micro pads and corresponding one of the plurality of second micro pads.

13. An image pickup device comprising:
a solid-state image pickup device in which a first substrate and a second substrate including circuit elements forming pixels and disposed therein are electrically connected by a connection unit, wherein
the solid-state image pickup device comprises:
an averaging circuit that averages signals accumulated in signal accumulation circuits respectively included in the two or more pixels that are pixels included in the same group and are averaging targets; and
an output circuit that outputs the averaged signals from the pixels,
the pixels are classified into a plurality of groups and each group includes the plurality of pixels, and
the pixels comprises:
photoelectric conversion elements disposed in the first substrate; and
the signal accumulation circuits that are disposed in the second substrate and accumulate signals which are generated by the photoelectric conversion elements and are input via the connection unit; further comprising:
a control unit that controls the output circuit such that the averaged signals are output from some pixels of the pixels that are averaging targets, and the averaged signals are not output from the other pixels of the pixels that are averaging targets.

14. A signal reading method of reading signals from pixels of a solid-state image pickup device in which a first substrate and a second substrate including circuit elements forming the pixels and disposed therein are electrically connected by a connection unit, the pixels are classified into a plurality of groups each of which includes the plurality of pixels, and the pixels include photoelectric conversion elements disposed in the first substrate and signal accumulation circuits disposed in the second substrate and accumulating signals that are generated by the photoelectric conversion elements and are input via the connection unit, the method comprising:
causing the photoelectric conversion elements to generate signals;
inputting the generated signals by the photoelectric conversion elements to the signal accumulation circuits via the connection unit;
averaging signals accumulated in signal accumulation circuits respectively included in the two or more pixels that are pixels included in the same group and are averaging targets; and
outputting the averaged signals from the pixels; further comprising:
a control unit that controls the output circuit such that the averaged signals are output from some pixels of the pixels that are averaging targets, and the averaged signals are not output from the other pixels of the pixels that are averaging targets.

15. A solid-state image pickup device in which a first substrate and a second substrate including circuit elements forming pixels and disposed therein are electrically connected by a connection unit, comprising:
an averaging circuit that averages color signals accumulated in signal accumulation circuits respectively included in the two or more pixels that are pixels included in the same group and are averaging targets; and
an output circuit that outputs the color signals from the pixels, wherein
the pixels are classified into a plurality of groups and each group includes the plurality of pixels,
the pixels comprises:
photoelectric conversion elements that are disposed in the first substrate and each of which generates a color signal of a color corresponding to any one of a plurality of colors; and
the signal accumulation circuits that are disposed in the second substrate and accumulate color signals that are generated by the photoelectric conversion elements and are input via the connection unit, and an arrangement of colors corresponding to the color signals generated by the photoelectric conversion elements disposed in the first substrate is different from an arrangement of colors corresponding to the color signals accumulated in the signal accumulation circuits disposed in the second substrate; wherein the pixels are arranged in a matrix, the averaging circuit averages the color signals corresponding to the same color of the color signals accumulated in the two or more signal accumulation circuits, and in the second substrate, the pixels that respectively include the two or more signal accumulation circuits accumulating the color signals, corresponding to the same color, averaged by the averaging circuit, are adjacent to each other in a column direction.

16. The solid-state image pickup device according to claim 15, wherein the averaging circuit averages accumulated color signals at timing after the color signals are accumulated in the signal accumulation circuits respectively included in the two or more pixels that are pixels included in the same group and are averaging targets.

17. The solid-state image pickup device according to claim 16, wherein, after the color signals are accumulated in the signal accumulation circuits, the averaging circuit averages the accumulated color signals between different groups at the same timing.

18. The solid-state image pickup device according to claim 15, wherein the two or more pixels included in the same group share the single connection unit.

19. The solid-state image pickup device according to claim 18, wherein the pixels are arranged in a matrix, and each group comprises the plurality of pixels arranged in the same column.

20. A solid-state image pickup device in which a first substrate and a second substrate including circuit elements forming pixels and disposed therein are electrically connected by a connection unit, comprising:

an averaging circuit that averages color signals accumulated in signal accumulation circuits respectively included in the two or more pixels that are pixels included in the same group and are averaging targets; and an output circuit that outputs the color signals from the pixels, wherein the pixels are classified into a plurality of groups and each group includes the plurality of pixels, the pixels comprises:

photoelectric conversion elements that are disposed in the first substrate and each of which generates a color signal of a color corresponding to any one of a plurality of colors; and the signal accumulation circuits that are disposed in the second substrate and accumulate color signals that are generated by the photoelectric conversion elements and are input via the connection unit, and an arrangement of colors corresponding to the color signals generated by the photoelectric conversion elements disposed in the first substrate is different from an arrangement of colors corresponding to the color signals accumulated in the signal accumulation circuits disposed in the second substrate; wherein, the pixels are arranged in a matrix, and the output circuit outputs averaged color signals from the pixels obtained by thinning out the pixels in the second substrate in a column direction.

21. A solid-state image pickup device comprising:

a first substrate;

a second substrate, opposing to the first substrate;

a plurality of connecting portion, arranged between the first substrate and the second substrate; and a plurality of groups, arranged in matrix, each of the plurality of groups including:

a plurality of pixels, each of the plurality of pixels having:

a photoelectric conversion element, disposed in the first substrate; and a signal accumulation circuit, storing a signal corresponding to an output of the photoelectric conversion element, the signal accumulation circuit having a capacitor, the capacitor disposed in the second substrate, the capacitor connected to the photoelectric conversion element via corresponding one of the plurality of connecting portion;

an averaging circuit, averaging the signals accumulated in the signal accumulation circuits of at least two of the plurality of pixels, the averaging circuit having a transistor, the transistor disposed in the second substrate, the transistor connected between the capacitors in the at least two of the plurality of pixels; and an output circuit, outputting the averaged signal.

22. The solid-state image pickup device according to claim 21, wherein the output circuit is activated only in a part of the plurality of groups.

23. The solid-state image pickup device according to claim 21, wherein the plurality of pixels are arranged in a column direction of the matrix.

* * * * *